United States Patent [19]

Weber et al.

[11] Patent Number: 5,196,093

[45] Date of Patent: Mar. 23, 1993

[54] WATER DISTILLER HAVING OPERATING PORTIONS THAT CAN BE REMOVED FOR CLEANING

[75] Inventors: Thomas J. Weber, Oak Creek, Wis.; Dale L. Garrison, Antioch, Ill.; Richard E. Forrest, Racine, Wis.

[73] Assignee: Emerson Electric Co., Racine, Wis.

[21] Appl. No.: 642,884

[22] Filed: Jan. 18, 1991

[51] Int. Cl.$^5$ .......................... B01D 3/42; C02F 1/04
[52] U.S. Cl. ................................ 202/83; 202/197; 202/202; 202/206; 202/241; 202/242; 202/266; 202/267.1; 134/93; 159/34; 203/3; 203/10; 203/DIG. 16; 203/DIG. 18
[58] Field of Search .............. 202/83, 163, 170, 176, 202/197, 202, 206, 241, 242, 266, 267.1; 203/1, 2, 3, 10, 11, DIG. 16, DIG. 17, DIG. 18, DIG. 22, 86; 159/34; 134/93

[56] References Cited

U.S. PATENT DOCUMENTS

| | | |
|---|---|---|
| 1,325,199 | 12/1919 | Jewell . |
| 2,079,897 | 5/1937 | Brown .................. 202/206 |
| 2,191,799 | 2/1940 | McKenna ............... 134/93 |
| 2,217,266 | 10/1940 | Cookson . |
| 2,376,876 | 5/1945 | Laliberte . |
| 2,420,819 | 5/1947 | Stefano . |
| 3,314,862 | 4/1967 | Hay ...................... 203/10 |
| 3,344,957 | 10/1967 | Duncan et al. ......... 134/93 |
| 3,382,157 | 5/1968 | Barnstead .............. 202/197 |
| 3,494,835 | 2/1970 | Mahistre . |
| 3,507,753 | 4/1970 | Jacuzzi . |
| 3,616,437 | 10/1971 | Yagishita ............... 203/1 |
| 3,687,817 | 8/1972 | Jimerson et al. ....... 202/181 |
| 3,830,705 | 8/1974 | Dewegeli . |
| 3,846,251 | 11/1974 | Hay ...................... 203/10 |
| 3,853,761 | 12/1974 | McClory . |
| 3,880,719 | 4/1975 | Massie .................. 203/DIG. 1 |
| 4,052,267 | 10/1977 | McFee . |
| 4,331,514 | 5/1982 | Bauer . |
| 4,339,307 | 7/1982 | Ellis . |
| 4,376,642 | 3/1983 | Verity . |
| 4,379,053 | 4/1983 | Brane . |
| 4,482,431 | 11/1984 | Voorhees . |
| 4,525,243 | 6/1985 | Miller . |
| 4,536,257 | 8/1985 | Atwell . |
| 4,556,484 | 12/1985 | Hunter et al. . |
| 4,612,090 | 9/1986 | Ellis . |
| 4,686,037 | 8/1987 | Lang . |
| 4,818,344 | 4/1989 | Glucksman . |
| 4,861,435 | 8/1989 | Sweet .................... 202/180 |
| 4,943,353 | 7/1990 | Shannon ................ 203/1 |

OTHER PUBLICATIONS

Consumer Reports (Jan. 1990) "Distillers" A Drop in the Bucket pp. 39–40.

Primary Examiner—Wilbur Bascomb, Jr.
Attorney, Agent, or Firm—Fuller, Ryan, Hohenfeldt & Kees

[57] ABSTRACT

A water distiller has a housing having an open interior area and a door that can be opened and closed to permit and block access into the interior area. A steam chamber is located in the interior area. The steam chamber includes a movable tray for holding water to be distilled. The tray seats against a fixed top where steam created in the chamber by heating the water in the tray is collected. By opening the door to the distiller, the tray can be unseated and removed for cleaning. After cleaning, the tray can be returned to the distiller and reseated against the top steam collecting portion by closing the door. In a preferred arrangement, the tray includes a chamber for holding a water soluble disinfectant for release during the distillation process.

22 Claims, 14 Drawing Sheets

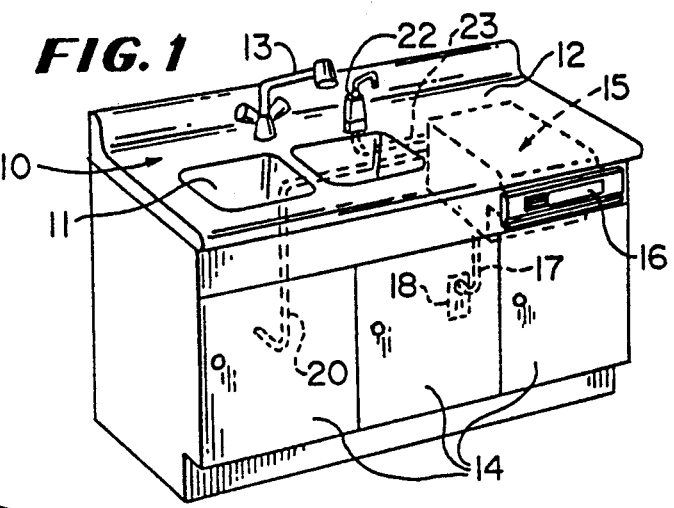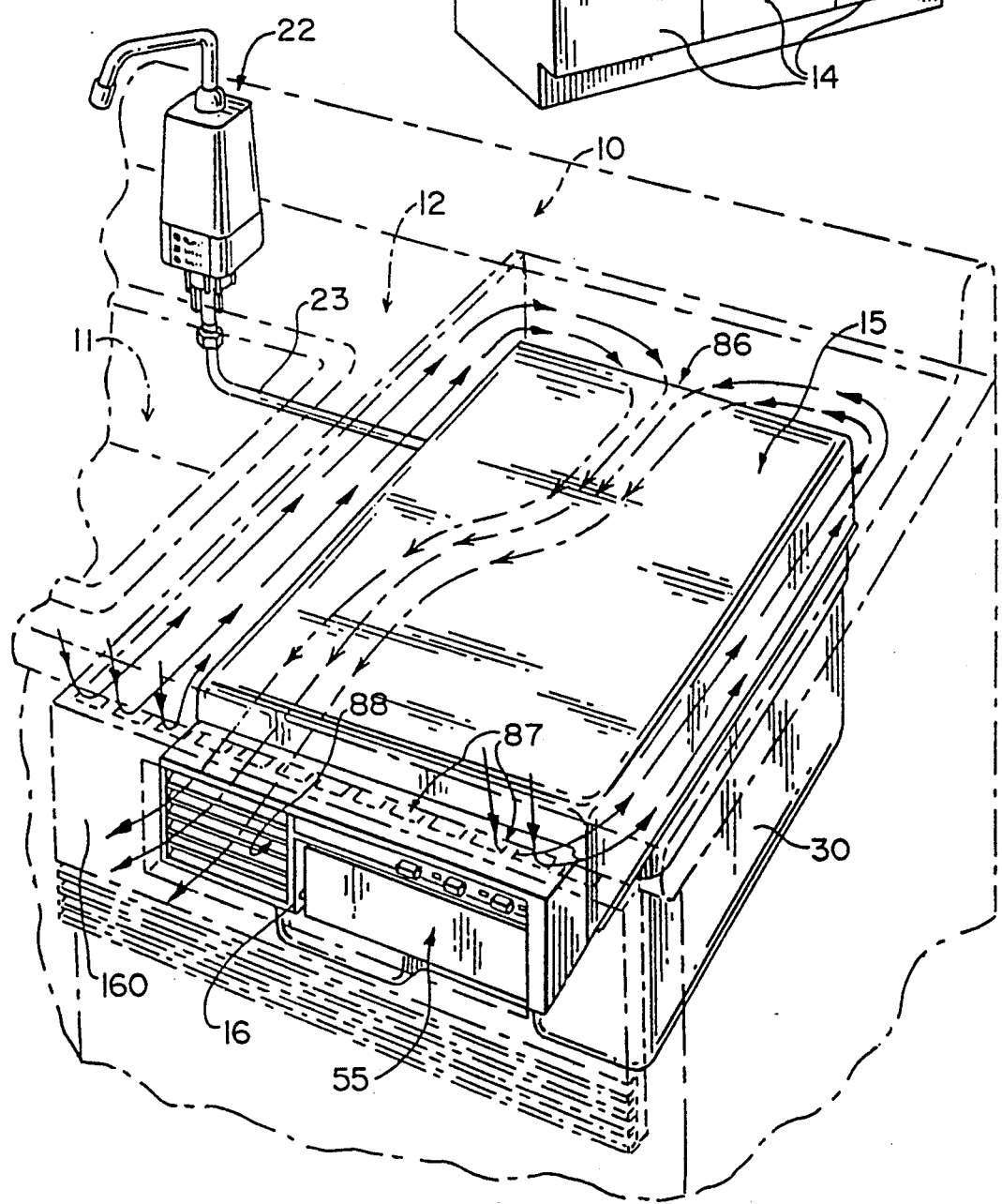

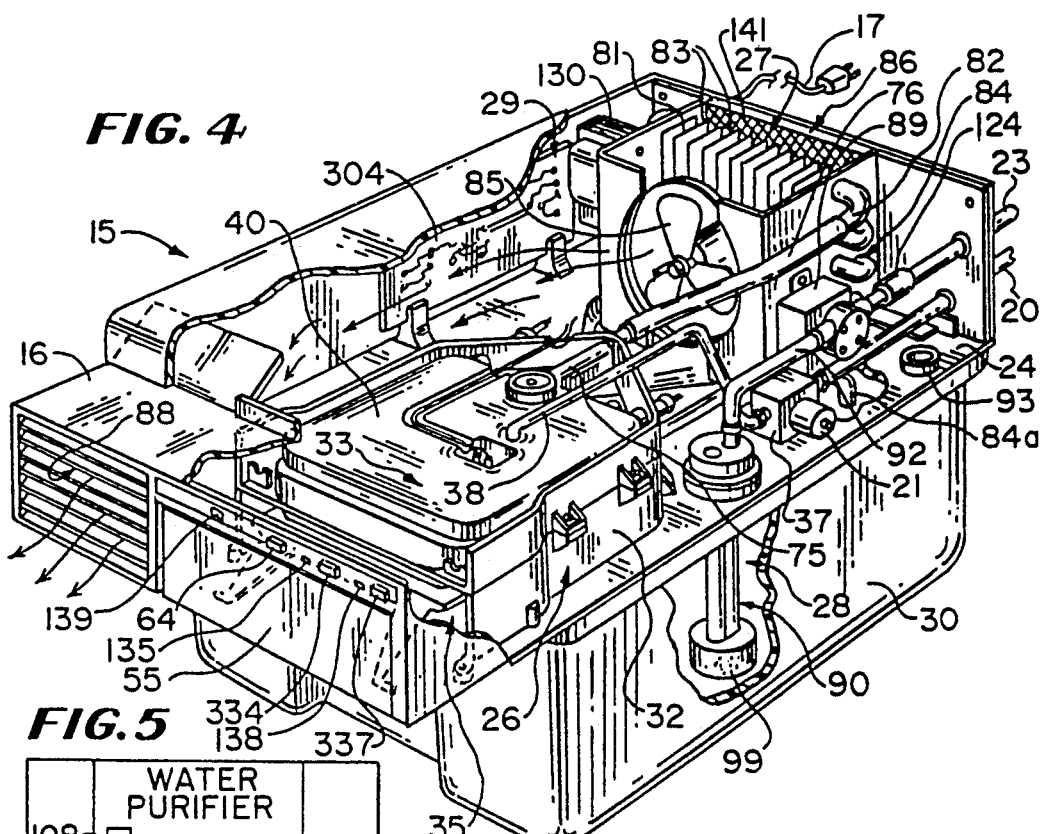
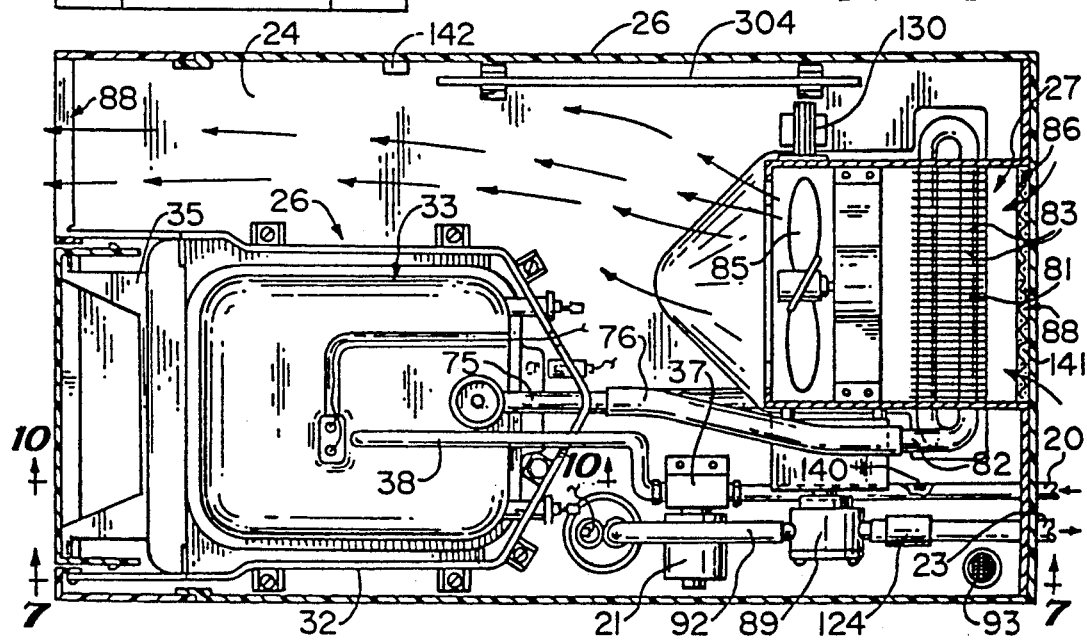

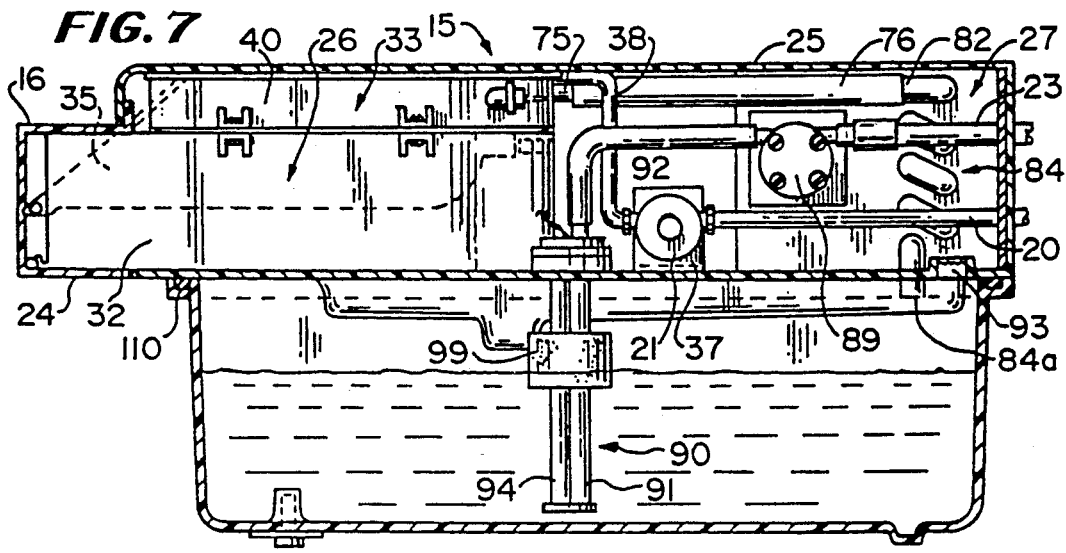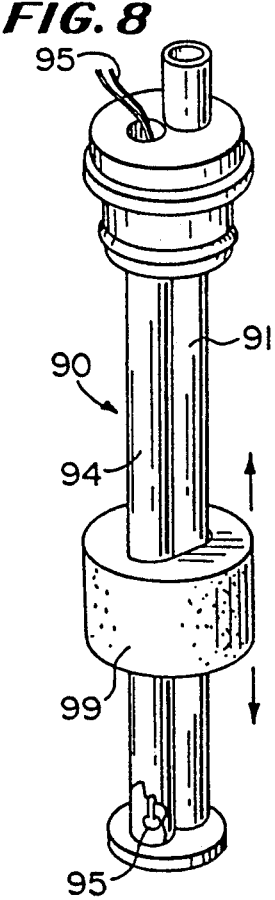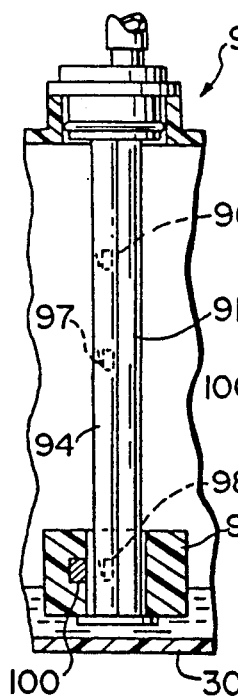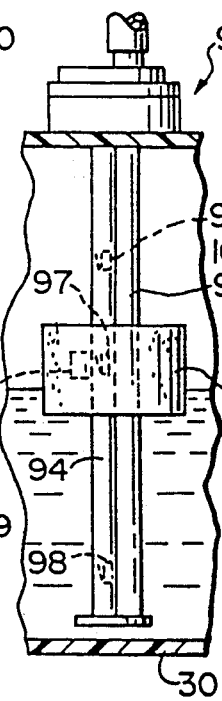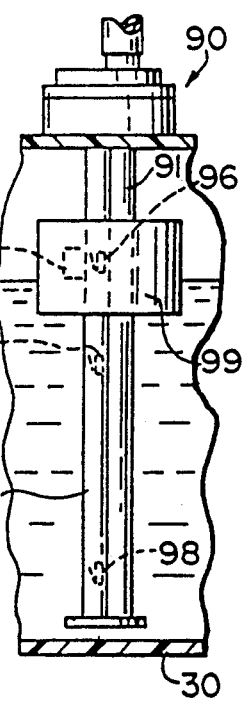

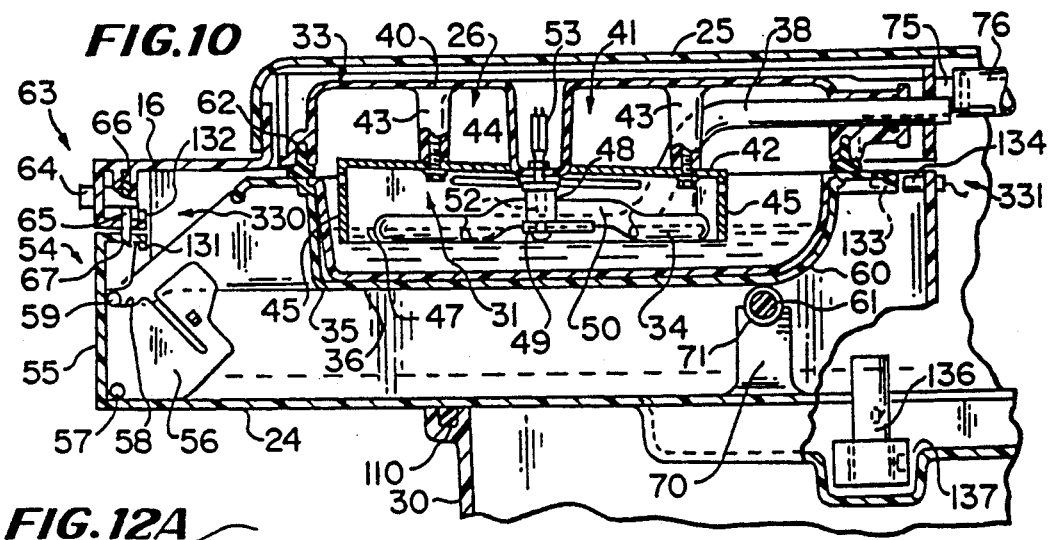
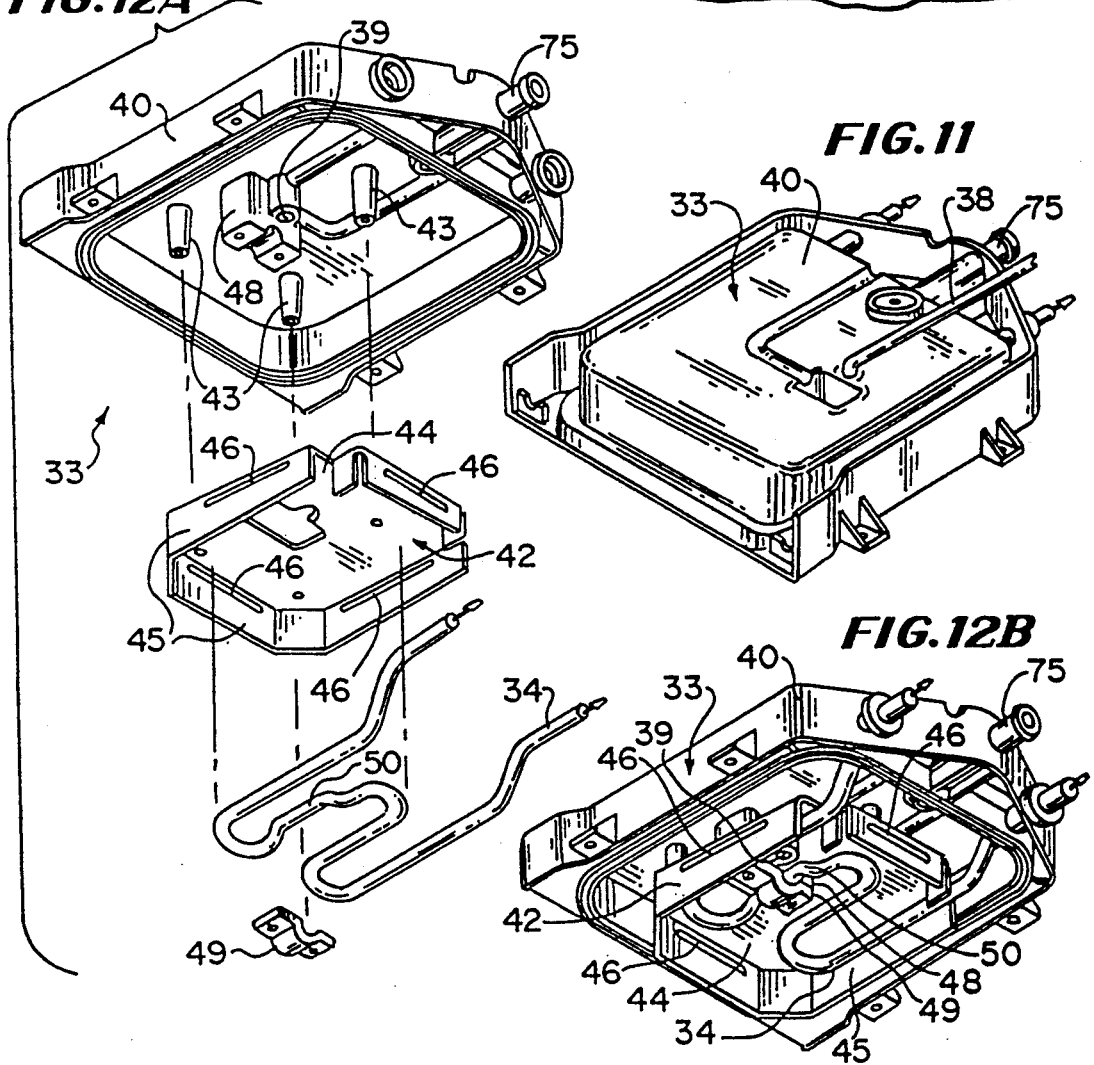

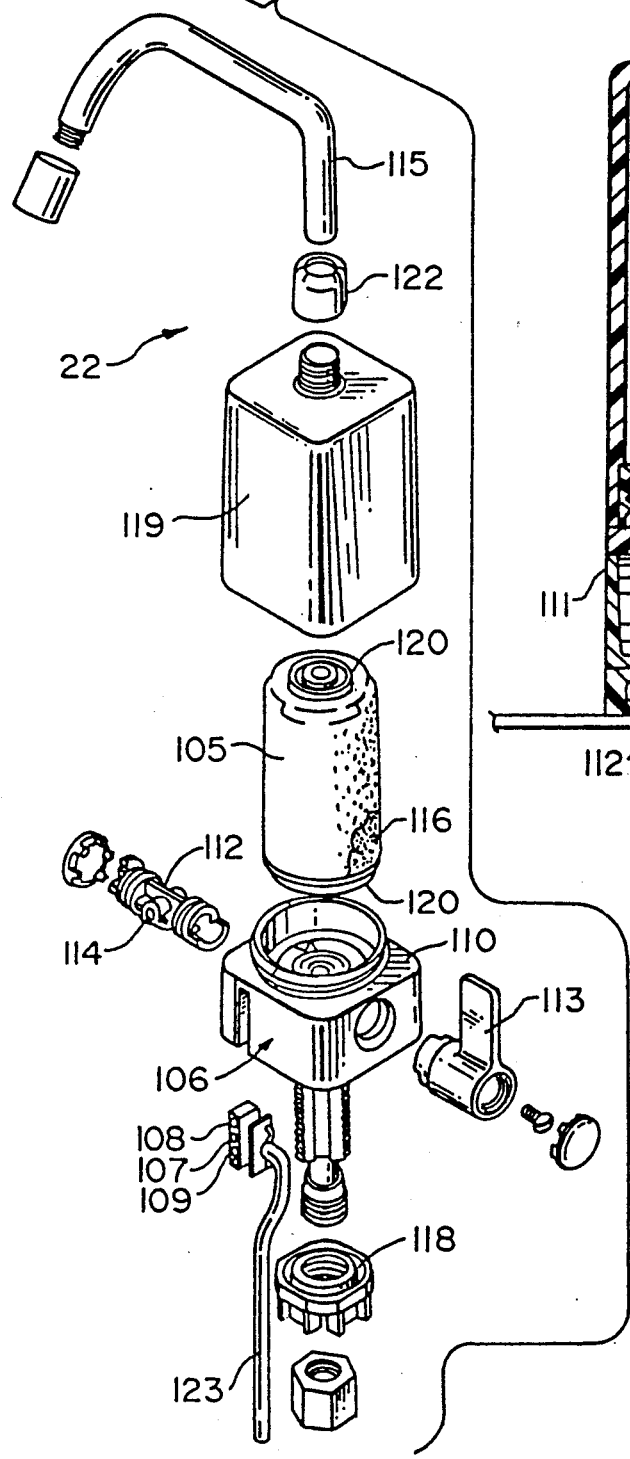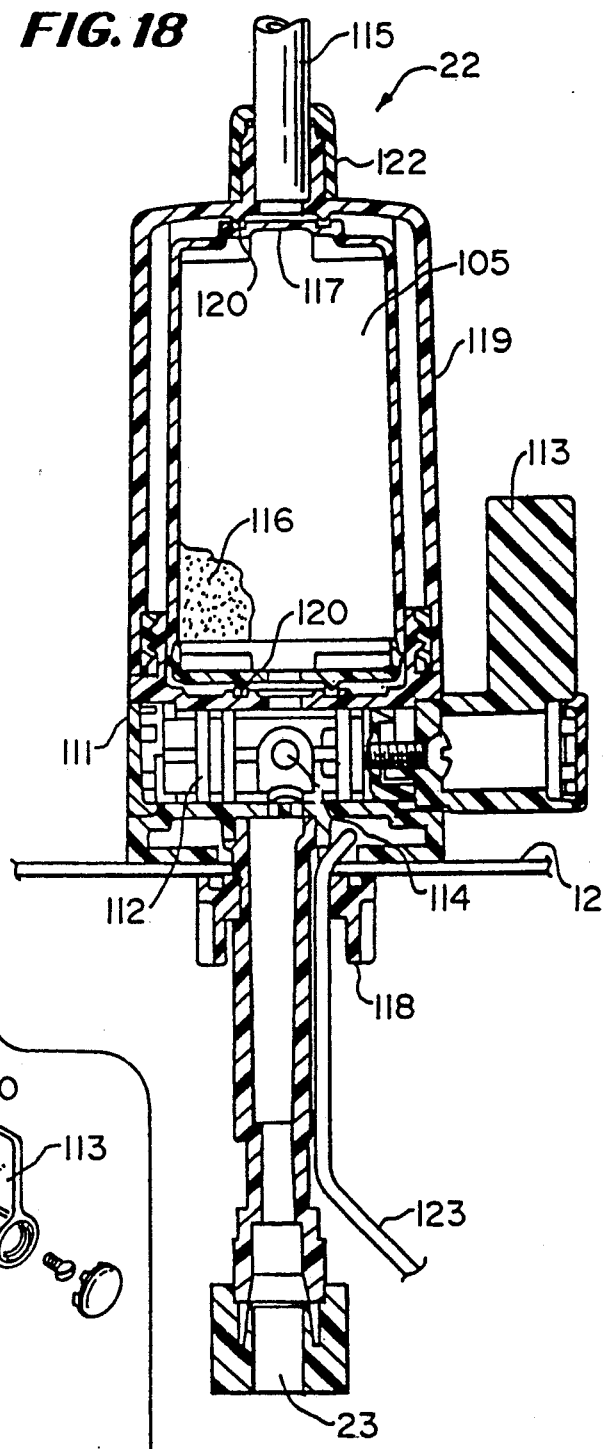

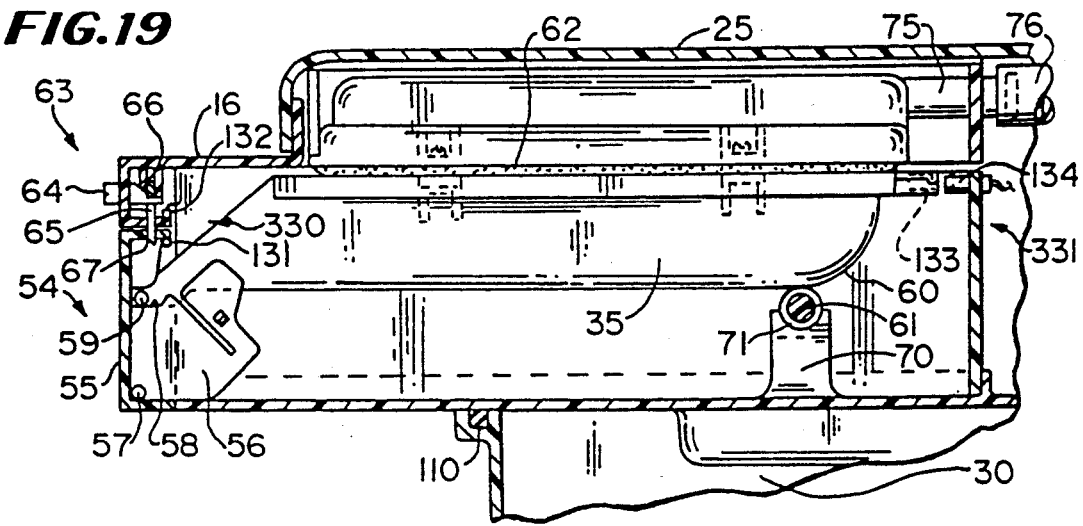
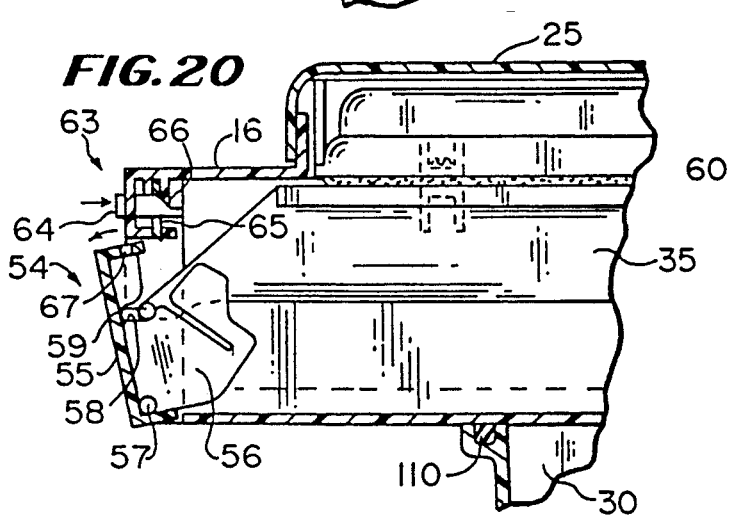
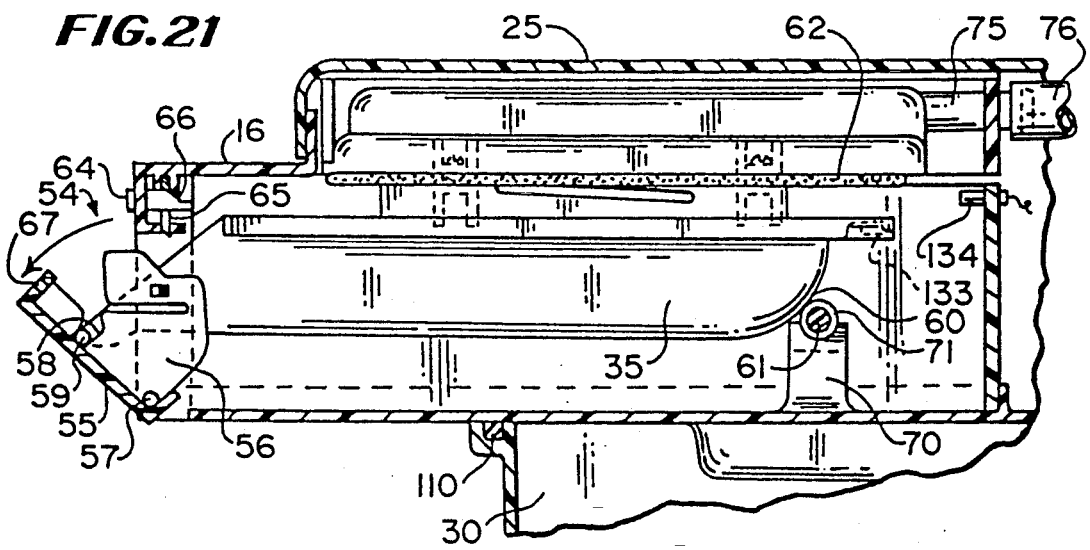

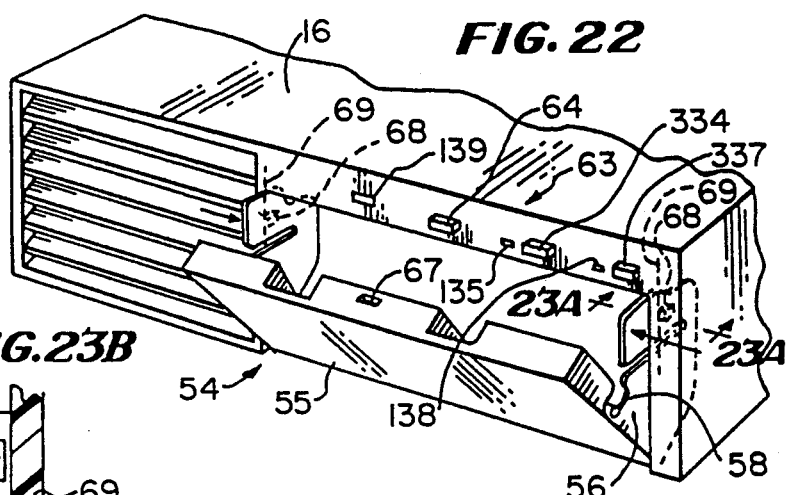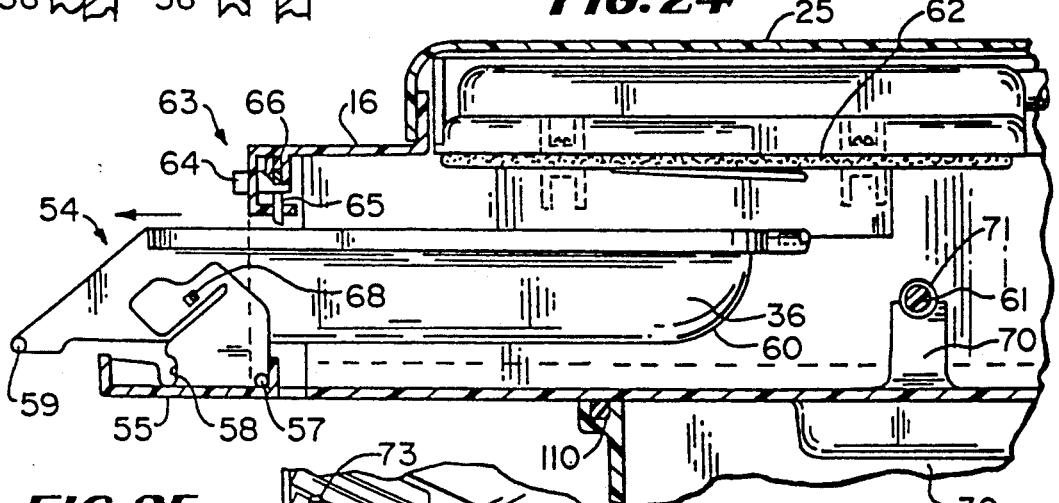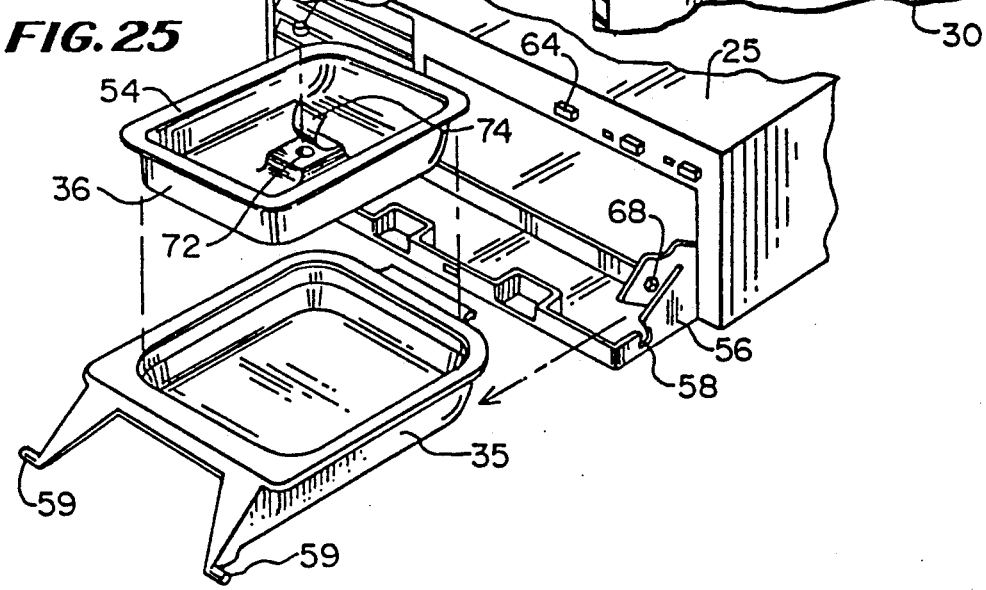

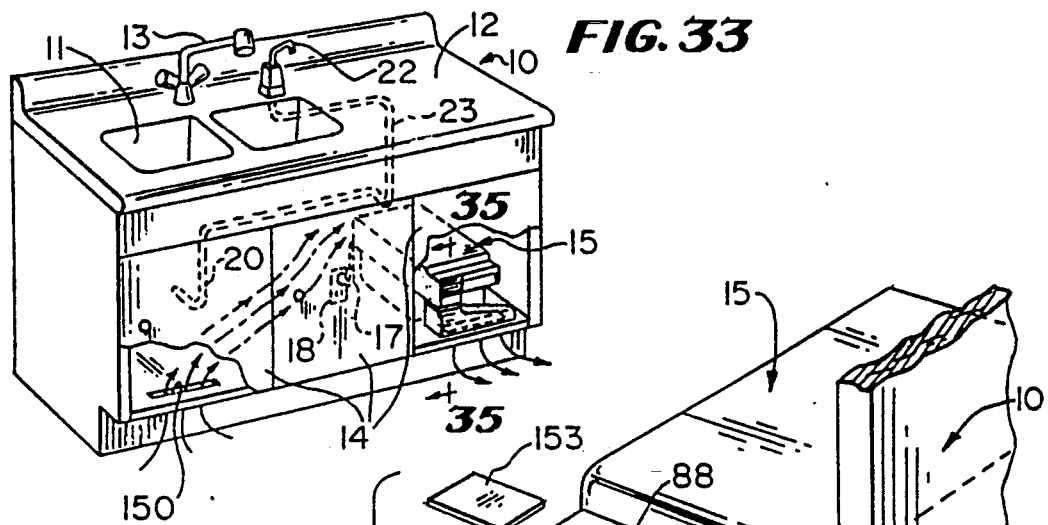
FIG. 33
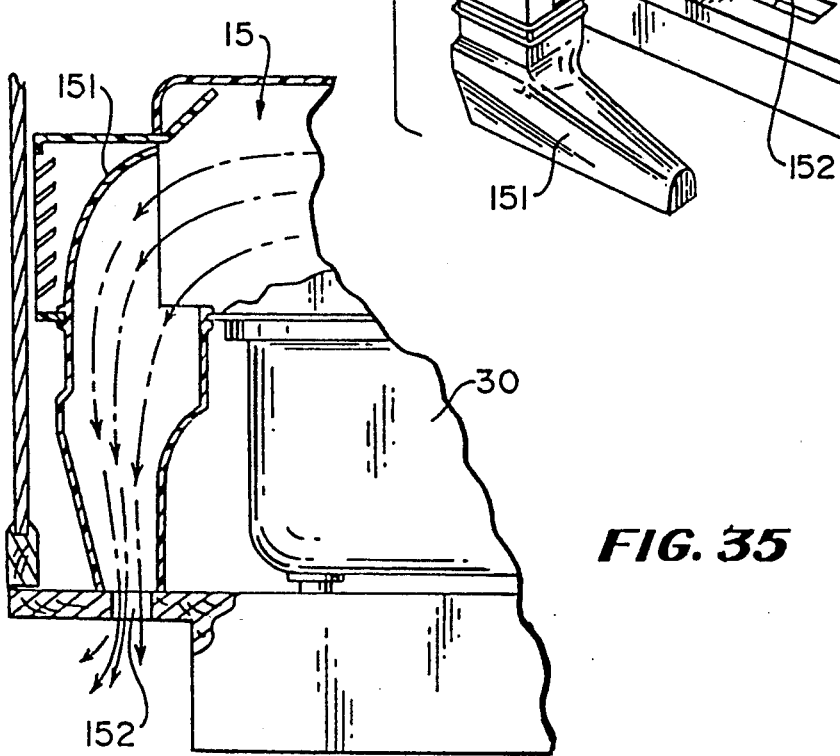
FIG. 34
FIG. 35

WATER DISTILLER HAVING OPERATING PORTIONS THAT CAN BE REMOVED FOR CLEANING

FIELD OF THE INVENTION

The invention relates to water distillers and related control systems.

BACKGROUND OF THE INVENTION

It is well known that water supplied to households from some wells and community water supplies often tastes unpleasant or is dangerous to drink because of minerals, chemicals, organisms and organic materials that are dissolved or suspended in the water. Widespread recognition of this information accounts for the variety of domestic water purification devices that have been developed and patented. However, use of water purifiers in homes is not as widespread as one would expect in view of the scope of the problem.

Most water distillers developed for home use have an electric heating element immersed in raw (that is, undistilled) water that is supplied to a boiler-evaporator from the water mains of a dwelling. The mass of water in the boiler is raised to boiling temperature. The resulting steam is conducted through a fin-type condenser coil from which the distillate emerges. In some designs a motor driven fan forces ambient air over the condenser fins for cooling and condensing the steam. In other designs the condenser coil is water cooled by locating it in a chamber into which the raw, comparatively cool water is fed before the raw water is conducted to the boiler, resulting in waste water. Most distillers on the market distill on a batch-by-batch basis rather than continually according to demand, as should be the case.

Among the reasons that installations of previously existing distiller designs have been small in number, although there is such a great need for them, is that the distillers are configured in a way that makes them difficult to install in a concealed and inconspicuous manner near the kitchen sink, where water is usually consumed in the home. Since an existing type of distiller would ordinarily be installed near the kitchen sink, one possibility is to stand the prior art types of distillers on a counter top next to the sink. Yet, most householders object to dedicating to a distiller precious counter top area, which is usually felt to be insufficient in most residences in the first place. Installation inconvenience becomes a factor in deciding not to buy any distiller presently on the market. Besides, most, if not all known prior art distillers can be characterized as lacking any redeeming aesthetic characteristics.

Another place in which a prior art distiller might be installed is in a cabinet near the kitchen sink. The problem with this is that prior art distillers are vertically oriented, that is, they have one component stacked on another so they have a tall profile or an inordinately great height dimension. As a practical matter, this means that they require dedication of a lot of below-the-counter top cabinet space, and it becomes impossible to use any of the space in the cabinet, above, below or on the sides of the distiller.

Besides deficiencies in aesthetic characteristics and excessive space utilization, prior art distillers are difficult to maintain in good operating condition, particularly, because of the difficulty of cleaning sediment and scale from the internal parts of the distiller. Most prior distillers require a substantial amount of disassembly and handling or working on multiple parts to fully clean the boiler of scale. This may be an aggravating factor that the user realizes only when the distiller fails to produce distilled water up to rated capacity. Facilitating easy and simple descaling and cleaning are problems that have frequently been attacked but have not been completely solved in prior distiller designs.

SUMMARY OF THE INVENTION

One objective of the invention is to provide a distiller in which water handling components, the electric heating element, water and cooling air flow paths, the clean out tray and so forth can be horizontally oriented such that the distiller can and does have a low profile and an overall configuration that allows it to be installed in kitchen cabinetry with minimum sacrifice of space that can be used for other purposes.

Another objective of the invention is to provide a distiller that has a water heating chamber in which the electric heating element is only partially immersed in the infeed or raw water, so that only a small mass or thin film of water is constantly being evaporated.

In a preferred embodiment, the partially immersed electric heating element is self-cleaning, without participation by the user. Self-cleaning or shedding of the scale from the heating element is done by automatically raising the temperature of the heating element without contact with water to cause the scale to break away and fall into the previously mentioned sediment collection tray of the new distiller.

The temperature control objective of the distiller is also met by a float switch assembly that is the initiator of various control functions. The float assembly senses the level of purified water available for use and actuates the distillation process when the level drops to a predetermined low level. The float assembly also varies the power delivered to the heating element according to the level of purified water. When the level corresponds to a lower than permissible distilled water level, the heating element operates at a maximum power level. When the purified water reaches an acceptable, but not yet full level supply, the heating element operates at a reduced power level.

Another important objective resides in providing a distiller having operating portions that can be easily removed by the used for periodic cleaning or as otherwise required during distillation operations.

One aspect of this objective is met by providing a two part steam chamber. The lower part of the chamber is a tray that is separable from the upper steam chamber part. Consequently, the lower chamber tray can be withdrawn from the distiller housing in the manner of a drawer for easy removal and disposal of mineral and other solid residue that is precipitated or concentrated from the raw water when water converts to steam.

In this aspect of the invention, a gasket is present at the interface of the removable clean out tray and the steam chamber of the boiler. Closing a door from which the tray is withdrawn for cleaning causes some camming surfaces on the tray to ride up on rollers that force the tray into positive sealing relationship with the gasket on the remaining upper part of the steam chamber.

A preferred embodiment employs secondary latches that prevent accidental withdrawal of the sediment tray. The secondary latches (which preferably would not be visible to a child) can be unlatched in a way that is not readily apparent, to preclude accidental withdrawal of the tray when it contains hot water.

Preferably, the two parts of the steam chamber extend lengthwise horizontally by an amount that is much greater than the combined height of the parts. In addition, an associated low profile condenser assembly draws ambient air through a finned condenser coil. The air flow paths to and from the condenser also are all oriented horizontally. The result is a distiller having a low profile dimension that requires only a small amount of cabinet space for installation, when compared to prior distillers.

The objective of easy cleaning is also met by providing a distiller having a purified water holding tank that can be readily swung into and out of a latched relationship with the remainder of the distiller for maintenance.

Another objective of the invention is to provide a steam chamber for a water distiller with features to actively prevent contamination. In one embodiment, this objective is met by providing a baffle over the heating element in the steam chamber that serves several purposes. One purpose is to prevent small globules of hot water from entering the inlet of the condenser, to thereby prevent possibly contaminated, impure water from mixing with the distillate. The Baffle also acts as a heat shield for the top steam chamber, which can be plastic and would otherwise be subjected to a very high temperature, particularly when the heating element is allowed to rise to a temperature sufficiently high to cause scale on the heating element to fracture and fall off into the sediment tray.

The objective of preventing contamination is also met by providing a check valve in the conduit through which steam flows from the steam chamber into the condenser. This check valve allows steam to pass when the steam chamber is operating while, on the other hand, prohibiting air to pass into the condenser and purified water holding water tank of the distiller when the tray is removed for cleaning.

Another objective of the invention is to provide a distiller having a control system that automates distillation operations. Except for periodic maintenance, the operations are independent of any user involvement. In one embodiment, the faucet through which purified water is dispensed also includes a series of lights that convey system operation messages to the user.

How these and other more specific objectives and features of the new unitary low profile water distiller are achieved and implemented will now be described in greater detail, with reference to the accompanying drawings.

DESCRIPTION OF THE DRAWINGS

FIG. 1 is a perspective view of a cabinet in which a kitchen sink is installed and in which the new low profile water distiller is installed;

FIG. 2 is an enlarged perspective view of the water distiller shown in FIG. 2 installed in the cabinet and showing the air flow paths to and from the distiller;

FIG. 4 is a perspective view of the top portion of the water distiller shown in FIG. 2, with the top and side walls removed;

FIG. 5 is a view of the status and attend indicator lights mounted on the faucet of the distiller shown in FIG. 1;

FIG. 6 is a top plan view of the water distiller shown in FIG. 4;

FIG. 7 is a profile elevation view of the right side of the water distiller shown in FIG. 4, taken generally along line 7—7 in FIG. 6;

FIG. 8 is an enlarged perspective view of the water level controller for the holding tank associated with the distiller shown in FIG. 4;

FIGS. 9A, 9B, and 9C are a series of views of the float of the water level controller shown in FIG. 8 at different positions depending upon the level of water present in the holding tank;

FIG. 10 is a side section view of the boiler area of the water distiller taken generally along line 10—10 in FIG. 6;

FIG. 11 is a top perspective assembled view of the steam chamber area of the water distiller;

FIG. 12A is an exploded perspective view of the steam chamber area of the water distiller;

FIG. 12B is a bottom perspective assembled view of the steam chamber area of the water distiller;

FIG. 17 is an exploded perspective view of the faucet associated with the water distiller shown in FIG. 1;

FIG. 18 is a side sectional view of the faucet shown in FIG. 17;

FIG. 19 is a sectional side view of the drawer and removable tray assembly associated with the steam chamber area of the water distiller shown in FIGS. 2 and 3, with the drawer shown in its closed and shut position;

FIG. 20 is a sectional side view of the drawer and removable tray assembly associated with the steam chamber area of the water distiller shown in FIGS. 2 and 3, with the drawer shown in an initially opened position;

FIG. 21 is a sectional side view of the drawer and removable tray assembly associated with the steam chamber area of the water distiller shown in FIGS. 2 and 3, with the drawer shown in its partially opened position;

FIG. 22 is a perspective front view of drawer and removable tray associated with the steam chamber area of the distiller shown in its partially opened position;

FIGS. 23A and 23B are enlarged side section views, taken along line 23—23 in FIG. 22, of the child-proof latching mechanism associated with the drawer and removable tray associated with the steam chamber area of the distiller;

FIG. 24 is a side sectional view of the drawer and removable tray assembly associated with the boiler area of the water distiller, with the drawer shown in its fully opened position;

FIG. 25 is a perspective exploded top view of the drawer and removable tray shown in FIGS. 19 to 24 removed from the distiller;

FIG. 33 is a perspective view of a cabinet in which a kitchen sink is installed and in which the new low profile water distiller is installed in a different position than shown in FIG. 1;

FIG. 34 is an exploded view of the air duct system associated with the cabinet installation of the water distiller shown in FIG. 33;

FIG. 35 is a side sectional view of the air duct system shown in FIG. 32; and

Figure 3:
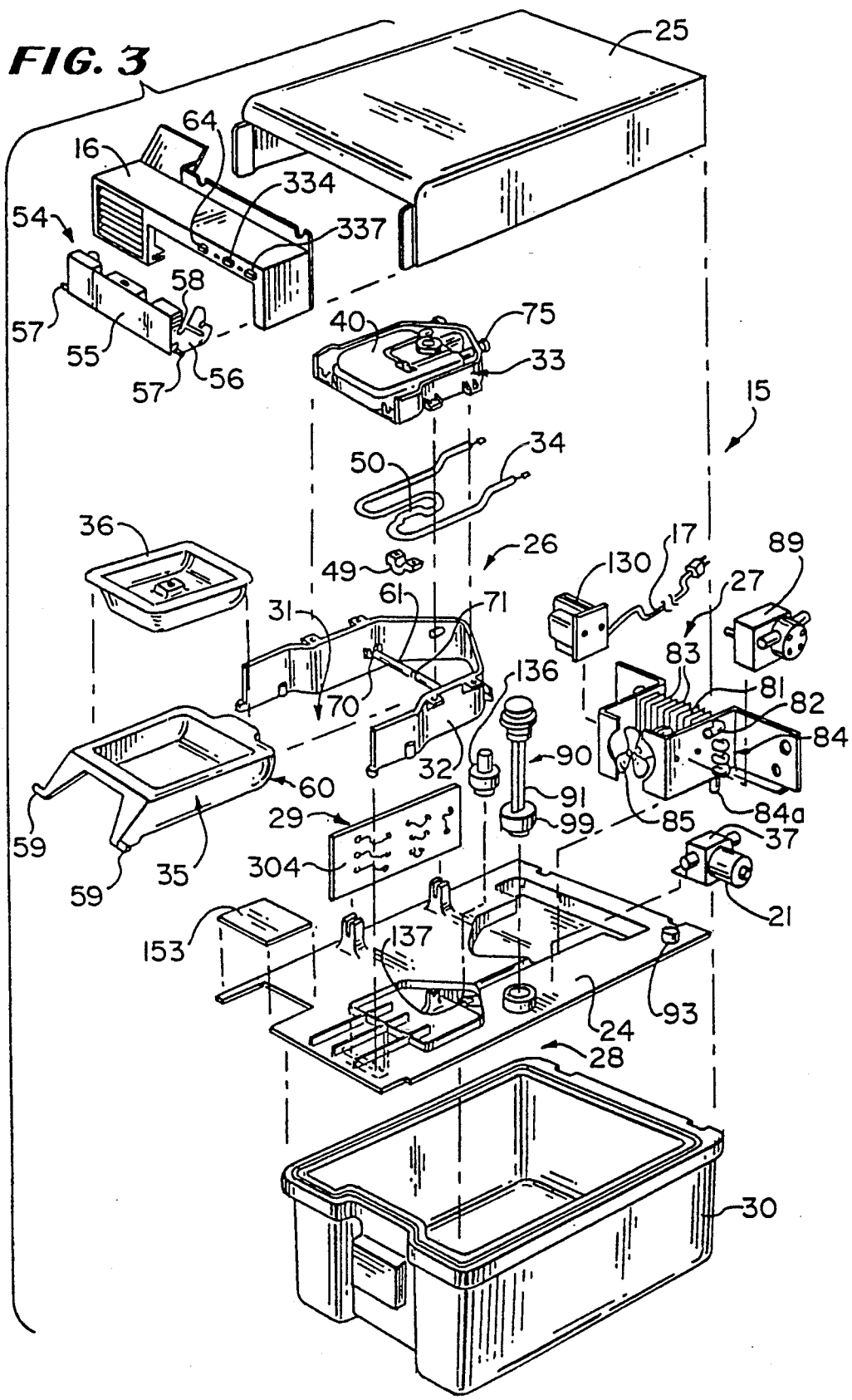
FIG. 3 is an exploded perspective view of the major component parts of the water distiller shown in FIG. 2.
Figure 13:
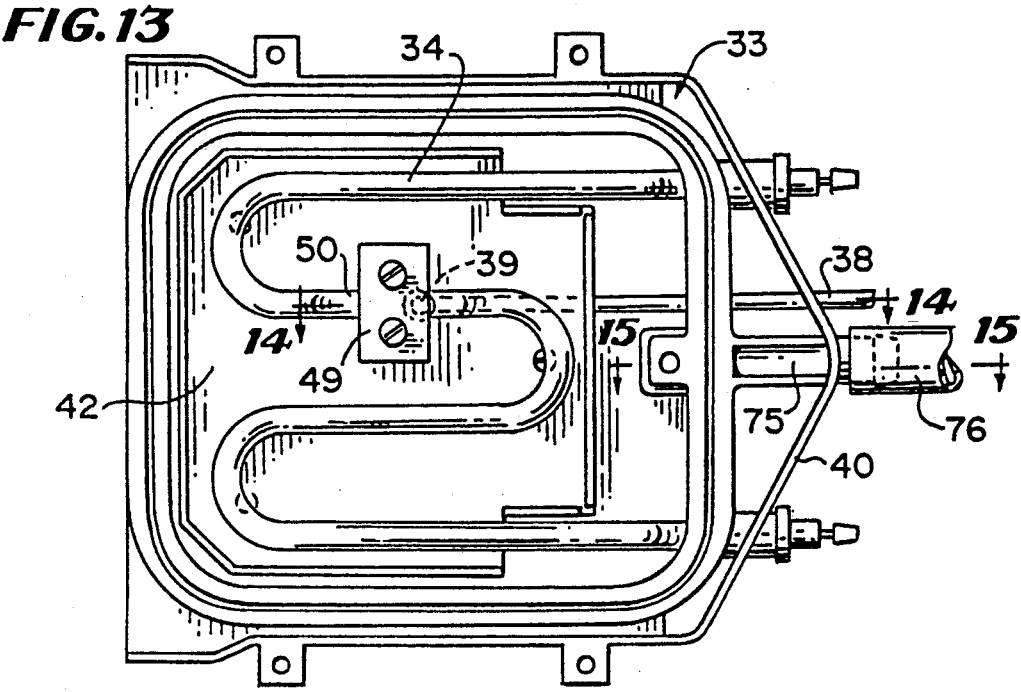
FIG. 13 is a bottom plan view of the steam chamber area of the water distiller.
Figure 14:
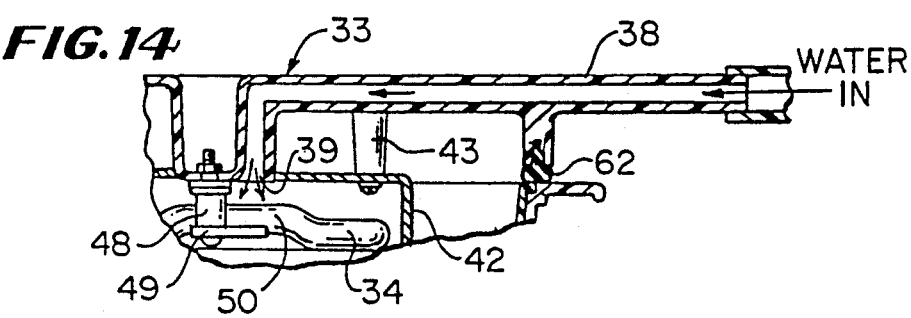
FIG. 14 is a side elevation view of the steam chamber area of the water distiller showing the passage of water into the boiler area.

The invention is not limited to the details of the construction and the arrangements of parts set forth in the following description or shown in the drawings. The invention can be practiced in other embodiments and in various other ways. The terminology and phrases are used for description and should not be regarded as limiting.

DESCRIPTION OF A PREFERRED EMBODIMENT

FIG. 1 shows a cabinet 10 as would be found in the kitchen of a typical residential dwelling. A typical two basin sink 11 is installed in the counter top 12 of the cabinet. A usual general purpose, swinging faucet 13 is mounted next to the sink 11 for providing possibly softened, but otherwise untreated hot and cold water. The cabinet includes swinging doors 14 for accessing storage space within the cabinet 10.

FIGS. 1 and 2 show a new unitary low profile water distiller 15 that embodies the features of the invention in one preferred manner of installation within the cabinet 10.

As installed in FIGS. 1 and 2, the distiller 15 may be assumed to be occupying a space that was occupied formerly by a cabinet drawer. A relatively small portion of the distiller 15 is exposed to view through a front panel 16 located above one swinging cabinet door 14.

The distiller 15 operates on readily available alternating current from the building mains. As FIG. 1 shows, the distiller 15 has an electrical power cord 17 that can be plugged into a convenience outlet 18 inside the cabinet. Alternatively, the electric cord 17 can be hard-wired to electrical lines within the cabinet 10.

FIG. 1 shows a pipe 20 that connects to the cold water supply lines of the building for supplying water to the distiller 15. As will be described in greater detail later, the distiller 15 purifies the water by distillation. A pipe 23 connects the faucet 22 to the distiller 15 (as FIGS. 1 and 2 show). The faucet 22 dispenses purified water from the distiller 15. The faucet 22 also will be described in greater detail later.

As FIG. 1 shows, despite the installation of the distiller 15 in the cabinet 10, a substantial amount of usable storage space still remains below the distiller 15 behind the swinging cabinet doors 14. Only the decorative front panel 16 of the distiller 15 is visible from the front of the cabinet 10. As the arrows in FIG. 2 show, air is brought into and exhausted from the distiller 15 through openings in the front panel 16. This aspect of the distiller operation will be described in greater detail later.

Because of its compact, low profile design, the distiller 15 can be easily installed in several different arrangements within a typical kitchen cabinet. Instead of the cabinet drawer installation shown in FIGS. 1 and 2, the same distiller 15 can be installed in the base of the cabinet 10 (as FIG. 33 shows). In this installation, a shelf, not shown, can still be placed immediately over the top of the distiller, so that much of the space in the cabinet 10 is still available for other uses. This installation employs a different arrangement for circulating air to and from the distiller 15 through the toe of the cabinet, as will be described in greater detail later. Otherwise, the installation is almost identical with the one shown in FIGS. 1 and 2.

Also because of its compact, low profile design, the distiller 15 can be easily installed in other areas of a typical kitchen. For example, in another alternate installation (not shown), the components of the distiller can be rearranged and mounted within a conventional refrigerator for dispensing chilled purified water or preparing ice made from the purified water.

The compact, low profile design of the distiller 15 is caused by the purposeful arrangement of interior component parts that convert the supply water to steam, condense the steam into purified water, and dispense the purified water. FIGS. 3 and 4 show the major interior component parts and their general arrangement within the distiller 15.

The distiller 15 includes a base 24 and an attached cover member 25 that together enclose an interior area that houses the major interior component parts. The decorative front panel 16 attaches to the cover member 25 to further enclose the interior area. The interior area houses a steam chamber assembly 26, a condenser assembly 27, a purified water dispensing assembly 28, and an operation control module 29. A holding tank 30 removably connects to the base 24 and forms a part of the purified water dispensing assembly 28.

I. THE STEAM CHAMBER ASSEMBLY

The details of the steam chamber assembly 26 will be first described. The steam chamber assembly 26 receives water from line 20 and converts the water into steam. The steam chamber assembly 26 includes a water heating chamber 31. An upright shroud 32 attached to the base forms the sidewall of the water heating chamber 31. A steam chamber cover 33 forms the top of the water heating chamber 31. The steam chamber cover 33 carries an electrical water heating element 34.

A drawer 35 forms the bottom of the water heating chamber 31. The drawer 35 carries a tray 36 in which water is boiled and converted to steam by operation of the water heating element 34. The steam chamber cover 33 receives the steam and conveys it to the condenser assembly 27 in a way that will be described in greater detail later.

FIGS. 6, 7, and 10 to 16 shown further details of the construction of the steam chamber assembly 26. Raw (that is, undistilled) water is supplied through the pipe 20 that connects to the inlet of a valve 37. The valve 37 is actuated electrically by a solenoid 21. An inlet conduit 38 connects to the outlet of the valve 37 for delivering water to the water heating chamber 31 via an inlet port 39 formed in the steam chamber cover 33 (best shown in FIG. 14). The solenoid 21 operates the valve 37 to supply water to the heating chamber 31 based upon command signals provided by the microcontroller module 29, as will be described in greater detail later.

FIGS. 10 to 12 show further details of the structure of the steam chamber cover 33. The steam chamber cover 33 includes an outer shell 40 that is fastened to the shroud 32. The outer shell 40 forms an inverted dome that defines the inside volume of a steam receiving chamber 41 positioned above the water heating chamber 31 (See FIG. 10). The outer shell 40 is preferably made of a plastic or noncorrosive metal material with a relatively high tolerance for heat.

A. CONTROL OF STEAM DISPERSAL WITHIN THE STEAM CHAMBER

A baffle 42 extends between the water heating chamber 31 and the steam receiving chamber 41. The baffle 42 is also preferably made of a noncorrosive metal with a relatively high heat tolerance. The baffle 42 is suitably fastened (using noncorrosive bolts or screws) to inwardly extending posts 43 of the outer shell 40. As FIG. 10 best shows, the posts 43 extend at unequal lengths so that, when fastened, the top interior surface 44 of the baffle 42 extends at an angle relative to the water heating chamber 31. As FIG. 10 also best shows, the side walls 45 of the baffle 42 also extend at unequal lengths from the top baffle surface 44 so that they compensate for the slope of the surface 44 and terminate along generally the same horizontal plane. The baffle side walls 45 include horizontally elongated slots 46 near their junction with the top baffle surface (as FIGS. 12A and 12B best show). The baffle side walls 45 also extend into the water to temper the temperature of the baffle 42 during distillation operations described later.

When heating element 34 energizes, there is vigorous boiling and agitation of the water at its surface 47 within the water heating chamber 31 (see FIG. 10). This results in small globules of water being propelled upward toward the steam receiving chamber 41 along with the steam. The steam escapes through the slots 46 into the steam receiving chamber 41. However, the larger water globules impact the top interior baffle surface 44, which blocks their passage into the steam receiving chamber 41. The water globules follow the slope of the baffle surface 44 and fall back into the water heating chamber 31.

Therefore, the baffle 42 allows only formed steam to enter the steam receiving chamber 41. The baffle 42 continuously returns water globules formed in the boiling process back into the heating chamber 31 for conversion into steam.

B. TEMPERATURE CONTROL WITHIN THE STEAM CHAMBER

As FIGS. 10 to 12 best show, the steam chamber cover 33 includes an inwardly extending heat sink 48 to which the electric heating element 34 is fastened by a mating clamp 49. When fastened, the clamp 49 forms a heat conducting part of the overall heat sink body. The clamp 49 includes a bottom surface 49a.

As FIGS. 10 and 12A show, the heating element 34 has a short section 50 that is deflected out of the plane of the remainder of the horizontally oriented heating element 34. The clamp 49 connects this deflected portion 50 of the heating element 34 to the heat sink 48 (as FIGS. 16A and 16B also show).

Figure 16A:
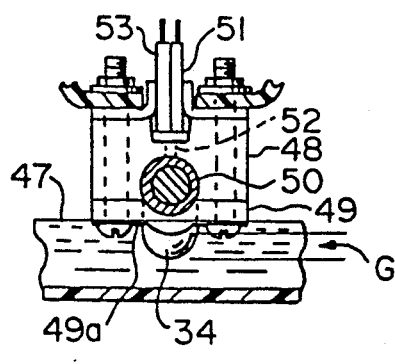
FIGS. 16A and 16B are a series of views of the water level controller in the steam chamber area of the water distiller in use at different water levels in the heating chamber.
Figure 16B:
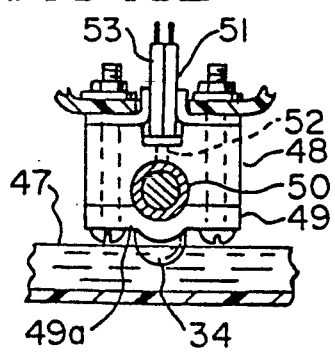

The heat sink 48 contains a top cavity 51 (see FIGS. 16A and 16B). The cavity 51 holds a heat sensor element 52. The sensor element 52 is in heat exchange relationship with the overall heat sink body 48 and 49. Two electric leads 53 extend out of the heat sensor element 52 and are operatively connected to the operation control module 29.

The heat sensor element 52 carried within the heat sink 48 is preferably a commercially available solid state device whose resistance varies linearly in relation to the temperature to which it is exposed. The specific operation of the sensor 52 and its relationship with the control module 29 will be described in greater detail later.

The offset between the two heating element portions 34 and 50 creates a vertical space or gap (identified by the letter G in FIGS. 16A and 16B) between the bottom clamp surface 49a and the bottom surface of the main section of the heating element 34. As the following Examples demonstrate, the vertical height of the gap G directly influences the level at which water is maintained in the water heating chamber 31 relative to the heating element 34 during the distillation process.

As the water level 47 in the water heating chamber 31 falls due to evaporation during the distillation process, progressively more of the heat sink 49 is exposed. When the meniscus of the water breaks from the bottom clamp surface 49a (as shown in FIG. 16B), the temperature sensed by the element 52 will increase rapidly. However, because the heat sink 49 is offset above the element 34, the water is still in contact the element 54, even though it is not in contact with the heat sink 49. Thus, as the temperature of the heat sink 49 rises, the temperature of the element 54 itself will remain relatively constant at its distillation temperature (about 100 degrees C.). Film boiling at the element 34 continues.

The rapidly rising temperature sensed by the element 52 will quickly reach a predetermined high end control temperature (about 110 degrees C.). The operation control module 29 responds to this condition by energizing the solenoid coil 21 to open the inlet valve 37. This opens the flow of undistilled source water into the water heating chamber 31 (through the previously described conduit 38 and port 39).

As the water level rises within the heating chamber 31, it will again make contact with the heat sink 49 (as FIG. 16A shows). The heat sink body 48 and 49 will experience a rapid temperature drop. The sensor 52 detects when the temperature drops below the high end control temperature, or another preselected control temperature less than the high end control temperature. The operation control module 29 responds to this condition by de-energizing solenoid coil 21 to close the inlet valve 37. This stops the flow of undistilled source water to the water heating chamber 31 (through previously described conduit 38 and port 39).

The control cycle continuously replenishes evaporated water with source water under the control of the offset sensor element 52 enclosed within the heat sink body 48 and 49.

The vertical height of the gap G directly controls the variance in the water level 47 in the heating chamber 31. Because of the rapid rise in temperature of the heat sink body 48 and 49 at the time the meniscus breaks from the bottom clamp surface 49A, the water level at which replenishment source water is brought into the heating chamber 31 can be closely controlled. The element 34 is kept in constant contact with water, and film boiling continues. The generation of significant radiant heat, which would occur if the water were allowed to drop below the element 34, is avoided. The generation of radiant heat is undesirable, as it fatigues the surrounding materials.

Because of the rapid fall in temperature as replenishment water again makes contact with the clamp 49, the water level at which the supply of replenishment source water is terminated is also closely controlled.

In the preferred and illustrated embodiment, the size of the gap G is selected so that the water level is maintained during the distillation process within ⅛ inch above and below the centerline of the heating element 34. At this level, optimal conditions for film boiling exist.

In the illustrated embodiment, the element 34 has a diameter of about 5/16 inch. The offset between the centerlines of the element 34 and the offset portion is about 3/16 inch. The bottom clamp surface 49 hangs about 1/16 inch below the bottom surface of the offset portion 50, creating a gap G of about ⅛ inch. When undergoing evaporation, the meniscus of the undistilled water is also observed to rise about ⅛ inch above the median surface of the water.

The material from which the heat sink body 48 and clamp 49 are made will also influence the level of water maintained. In the illustrated and preferred embodiment, the bodies 48 and 49 are made of a high noncorrosive heat conductive material like copper.

The flow rate at which undistilled source water is brought into the heating chamber 51 will also influence the replenishment time. In a preferred arrangement (to be described in greater detail later), the element 54 can be turned off when the high end control temperature is reached (simultaneously with the opening of the inlet valve 37) to quicken the time it takes to cool down the heat sink 49. In this arrangement, the element 54 is turned back on when the temperature drops below the high end control temperature, or another preselected lower temperature.

The following Example demonstrates the benefits of this aspect of the invention.

EXAMPLE

Test #1:

A copper heat sink like that shown in FIGS. 16A and 16B was clamped to an electrical heating element. However, unlike the heating element shown in FIGS. 16A and 16B, the heating element in Test #1 was generally coplanar in overall configuration (that is, it did not include the offset portion 50). The bottom surface of the heat sink (corresponding to the bottom surface of the clamp 49) extended about 1/16-inch below the bottom surface of the heat element. A heat sensor element 52 comprising a Micro Switch TD5A RTD was carried within the heat sink.

The heating element and heat sink assembly were submerged in water in a steam chamber, and power was applied to the element to boil the water.

As the water evaporated, the water level fell to a point where the meniscus of the water broke away from the bottom surface of the element (the meniscus was observed to rise about ⅛ inch above the normal plane of the water). However, the lower extending bottom surface of the heat sink continued to be submerged in the water, still cooling the heat sensing element. As a result, the surface temperature of the element soared to about 600 degrees C. before the heat sink reached its high end control temperature set at about 110 degrees C.

This arrangement was unsatisfactory because (i) a significant amount of radiant heat was generated in the steam chamber, (ii) there was no film boiling occurring after the meniscus of the water broke away from the heating element and before the heat sensor reached its high end control temperature to admit more water into the steam chamber, and (iii) the water level within the steam chamber fluctuated significantly above and below the centerline of the heating element (where most effective film boiling conditions exist).

Test #2:

In this test, a heating element with an offset portion 50 was used. The centerline of the offset portion 50 was spaced about ¼ inch above the centerline of the rest of the element. A copper heat sink like that shown in FIGS. 16A and 16B was clamped to the offset portion. The lower surface of the heat sink (i.e., the bottom of the clamp 49) extended about 1/16 inch below the bottom surface of the offset portion, creating a gap of about 3/16 inch between the lower surface of the heat sink and the lower surface of the main section of the element. A heat sensor element 52 comprising a Micro Switch TD5A RTD was carried within the heat sink.

As in Test #1, the heating element and heat sink assembly were submerged in water in a steam chamber, and power was applied to the element to boil the water.

In this arrangement, the meniscus of the boiling water broke away from the bottom surface of the heat sink while the main portion of the heating element was still submerged in the water. When the heat sensor reached its high end control temperature of 110 degrees C. (thereby admitting more water into the steam chamber), the main portion of the heating element was still at its desired film boiling temperature of about 100 degrees C.

The generation of significant radiant heat (observed in Test #1) was eliminated in Test #2. However, it was observed that the water level within the steam chamber still fluctuated somewhat above and below the desired level at the centerline of the heating element, although the range of the variance was significantly reduced, when compared to the variance observed in Test #1.

Test #3:

As in Test #2, a heating element with an offset portion 50 was used. However, the offset (again, as measured between the centerlines of the offset portion and the main element portion) was reduced to about 3/16 inch. A copper heat sink like that shown in FIGS. 16A and 16B was clamped to the offset portion. The lower surface of the heat sink (i.e., the bottom of the clamp 49) still extended about 1/16 inch below the lower surface of the offset portion, creating a gap of about ⅛ inch between the lower surface of the main element and the lower surface of the main section of the element (which approximates the normal rise of the water meniscus observed in the tests). A heat sensor element 52 comprising a Micro Switch TD5A RTD was carried within the heat sink.

As in the other tests, the heating element and heat sink assembly were submerged in water in a steam chamber, and power was applied to the element to boil the water.

In this arrangement, the meniscus of the boiling water broke from the bottom surface of the heat sink while the main portion of the heating element was still submerged in the water. When the heat sensor reached its high end control temperature of 110 degrees C. (thereby admitting more water into the steam chamber), the main portion of the heating element was still at its desired film boiling temperature of 100 degrees C.

As in Test #2, the generation of significant radiant heat (observed in Test #1) was eliminated. Furthermore, the water level within the steam chamber was maintained generally within ⅛ inch above and below the centerline of the heating element.

Tests #1, #2, and #3 demonstrate the benefits of locating the heat sensing element within a heat sink body above the surface of the main heating element. The use of the offset prevents the generation of high radiant heat in the steam chamber during the distillation cycle by continuously maintaining contact between the water and the main portion of the heating element. Test #1, #2, and #3 also demonstrate that the amount of offset controls the variance in the water level with respect to the heating element during the distillation process. The use of the offset permits the control of the water level within the steam chamber at the optimal range for film boiling.

The sensor element 52 anticipates rises and falls in temperature along the main body of the heating element 34 by sensing temperature at the deflected short portion 50 of the element 34 that is positioned above the main body of the element 34 and the water level present within the chamber 31. The distiller 15 can thereby maintain a consistent water level over the main body of the element 34 that is ideal for generating steam. The distiller 15 does not over-submerge the heating element, but instead maintains a thin film of water along the centerline of the heating element 34, where it can be continuously converted to steam.

C. CLEANING THE STEAM CHAMBER

The control module 29 of the distiller 15 preferably periodically operates in a self-cleaning mode that overrides the normal operation of the sensor element 52 as just described. In the self-cleaning mode, the control module 29 allows the water level 47 to drop below the level shown in FIG. 16B by closing the inlet valve 37. During the self-cleaning mode, the heating element 34 operates for a sufficient period to create temperatures above that needed for distillation (for example, temperatures exceeding 150° C.). The high temperature causes accumulated scale to fracture from the element 34 and drop into the tray 36. The self-cleaning mode ends after a predetermined temperature is achieved.

The drawer 35 can be operated periodically open the steam chamber assembly 26 to remove the tray 36 for cleaning and disposal of the scale deposited during the self-cleaning mode just described.

FIGS. 10 and 19 to 25 best show the details of the drawer 35 and removable tray 36. The drawer 35 removably receives the tray 36 (as FIG. 25 shows). The drawer 35 (carrying the tray 36) is movable between fully closed position (see FIGS. 10 and 19) and a fully open position (see FIGS. 21 and 22).

The distiller 15 includes a latching mechanism 54 carried on the decorative front panel 16 for manipulation by the user. By operating the latching mechanism 54, the user can move the drawer 35 between its fully opened and fully closed position.

The latching mechanism 54 includes a swinging drawer front 55 that includes a pair of side wings 56. The side wings 56 are each pivotally mounted by a pin 57 to the panel 16. The drawer front 55 therefore swings about the pins 57 between a fully closed position (as FIG. 19 shows) and a fully opened position (as FIG. 24 shows). Each side wing 56 includes a camming groove 58 that receives a pin 59 carried on each front edge of the drawer 35 (see FIG. 3 also).

The drawer 35 further includes a curved rearward camming surface 60 that rides along a camming roller shaft 61 as the drawer 35 moves between its fully open and closed positions. The camming shaft 61 is mounted for rotation on two laterally spaced apart supports 70 on the shroud 32 (see FIG. 3). Two rubber o-rings 71 on the shaft 61 resiliently bear against the camming surface 60.

The user can move the drawer 35 within the distiller 15 by opening and closing the swinging drawer front 55 on the panel 16.

More particularly, as the drawer front 55 moves toward its closed position, the drawer 35 (carrying the tray 36) also moves toward its fully closed position. The camming action of curved surface 60 along the roller shaft 61 (and o-rings 71) raises the drawer 35 away from the base 24 of the distiller 15. This in turn presses the top surface of the drawer 35 against a gasket 62 (see FIG. 19). Upon arriving at its fully closed position, the drawer 35 lodges in full sealing relationship with the outer shell 40 of the steam chamber cover 33.

As the drawer front 55 moves toward its opened position, the drawer 35 (with tray 36) also moves toward its fully opened position. The camming action of curved surface 60 along the roller shaft 61 (and o-rings 71) gently lowers the drawer 35 toward the base 24 of the distiller 15. This in turn breaks the sealing relationship between the drawer 35 and the outer shell 40 of the steam chamber cover 33. Upon reaching its fully opened position, the drawer 35 can be removed by sliding out of the association with the steam chamber assembly 26 of the distiller 15.

In the illustrated and preferred embodiment, the latching mechanism 54 includes a lock assembly 63 that maintains the swinging drawer front 55 in its fully closed position. As FIGS. 19 and 20 best show, the lock assembly 63 includes a locking button 64 that extends from the front panel 16. The locking button 64 is movable between a normal position (shown in FIG. 19) and a depressed position (shown in FIG. 20). A spring (not shown) biases the button 64 toward its normal position.

The lock assembly 63 also includes a locking pin 65, a transverse portion of which rides upon a cam surface 66 formed on the interior end of the button 64. When the button 64 is in its normal position, the locking pin 65 extends downward through a latch opening 67 in the top of the swing drawer front 55. The interference of the pin 65 within the opening 67 locks the drawer front 55 in its fully closed position. When the button 64 is depressed (as FIG. 20 shows), the pin 65 rises along the cam surface 66 out of the opening 67, allowing the user to open the drawer front 55.

In the illustrated and preferred embodiment (see FIGS. 21 to 23), the latching mechanism 54 also includes a "child-proof" latching features that prevents the drawer front 55, once unlocked and opened, from being immediately brought to a fully open position.

More particularly, the latching mechanism 54 includes a pair of outwardly extending tabs 68 formed on each side wing 56. The tabs 68 abut against adjacent side edges 69 of the panel 16 when the drawer front 55 reaches an intermediate position between its fully opened and fully closed position (shown in FIGS. 21 and 22). The tabs 68 thereby prevent further opening of the drawer front 55. This arrangement prohibits anyone, particularly a child, from withdrawing the drawer 35 without regard to the fact that it may have hot water in it.

The side wings 56 are resiliently movable by an adult user in the area surrounding the tabs 68. By moving the side wings 56 toward each other, the adult user can free the tabs 68 from the side edges 69 (see FIG. 23B), thereby allowing the drawer front 55 to be brought into its fully opened position.

As will be described later, the control module 29 notifies the user when it is time to open the drawer 35 and remove the tray 36 for cleaning.

The removable tray 36 (see FIG. 25) preferably is made of a temperature resistant plastic material. In this way, the plastic tray 36 may be disposed of and replaced with a clean tray 36 after each self cleaning mode.

Alternatively, the tray 36 can be made of a more durable material for repeated use. In this embodiment, the tray 36 can be scrubbed to remove the sediment or can be placed in an automatic dishwasher for cleaning.

Because all sediment including minerals and other solids derived from the raw water can only accumulate in the tray 36, nothing more needs to be done by the user to clean the distiller.

D. CONTAMINANT CONTROL IN THE STEAM CHAMBER AND BEYOND

In the illustrated and preferred embodiment (as FIG. 25 shows), the tray 36 includes an interior cavity 72 for holding a water soluble disinfecting material. In the illustrated embodiment, the disinfecting material is in the form of a pill 73 placed into the cavity 72. A removable patch 74 overlies the pill-containing cavity 72. The patch 74 can be removed by the user at the time the tray 36 is placed into the drawer 35 for use. Alternatively, the patch 74 can be made of an inert material that dissolves when contacted by water.

Water in the water heating chamber will dissolve the disinfecting material. The disinfecting material will eventually be carried by the distillation process to the other parts of the distiller 15, thereby disinfecting them.

The steam chamber assembly 26 includes a conduit 75 that conducts steam from the steam receiving chamber 41 to the condenser assembly 27. The conduit 75 forms an integral part of the outer shell 40 and connects to tubing 76 that extends along a horizontal plane to the condenser assembly 27.

The steam chamber assembly 26 includes a check valve 78 for opening communication between the steam receiving chamber 41 and the condenser assembly 27 only when steam is present. Without steam pressure, the check valve 78 blocks communication between the steam receiving chamber 41 and the condenser assembly 27.

Figure 15:
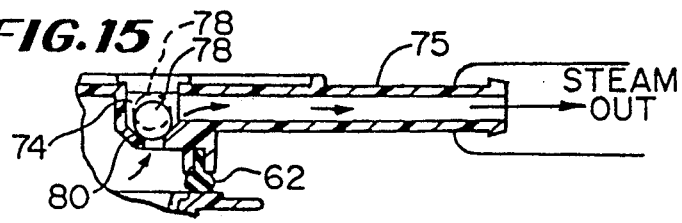
FIG. 15 is a side elevation view of the steam chamber area of the water distiller showing the passage of steam out of the area.

FIG. 15 shows the details of the check valve 78. The conduit 75 forms a check valve chamber 79. When normal atmospheric pressure conditions exist within the chamber 79, the check valve 78 rests upon an annular beveled seat 80 to close the conduit 75.

When steam is being generated, steam pressure in the chamber 41 rises to slightly above atmospheric pressure. The increased steam pressure lifts the check valve 78 to the position shown in phantom lines in FIG. 15. The up-lifted check valve 78 opens the conduit 75 to allow steam to pass to the condenser tube 38. As steam continues to flow, the check valve 78 is urged further toward its up-lifted position by the negative pressure that develops in the condenser assembly 27 because of the steam or hot vapor condensing to a liquid, which reduces its volume.

One important reason for employing the check valve 78 is to prevent ambient air from freely flowing into the condenser assembly 78. This can, in turn, result in the ambient air carrying contaminants into the holding tank 30. The potential for this occurring is the greatest when the drawer front 55 opens and the drawer 35 is withdrawn. The ambient air can be contaminated with molecules that are sensed as odoriferous or that impart an unpleasant taste to the distilled drinking water. There also may be microorganisms in the air that might thrive in the distilled water. The check valve 78 is effective to block access by contaminants to the interior regions of the distiller.

II. THE CONDENSER ASSEMBLY

FIGS. 3, 4, and 6 best show the details of the condenser assembly 27.

The condenser assembly 27 includes a finned condenser coil 81. As before described, the steam from the steam receiving chamber 41 is discharged through conduits 75 and 76 to the inlet 82 of the condenser coil 81. The condenser coil 81 includes several generally vertically oriented cooling fins 83. The steam follows a serpentine path 84 past the cooling fins 83, where it condenses into distilled water. The condensed, distilled water exits the path 84 through an outlet 84a into the holding tank 30 (as best shown in FIGS. 4 and 7).

During the condensation process, the distiller 15 continuously circulates air through the fins 83 to cool them. Arrows in FIGS. 2, 3, 4, and 6 show the air flow path through the distiller 15. A fan 85 draws air in through an intake opening 86 in the back of the cover 25. Preferably, an air filter 141 occupies this opening 86.

Ambient air is brought to the intake opening 86 of the distiller 15 through a series of inlet vents 87 formed in a face panel 160 that fits over the front panel 16 (see FIG. 2). The fan 85 directs the air through the fins 83 and then past the shroud 32. The air exits an out take vent 88 in the front panel 16. The FIGURES show a single out take vent 88, although more than one can be provided. As FIGS. 2 and 4 best show, air flows in an essentially horizontal plane through the fins 83 and through the interior of the distiller 15.

Figure 30:
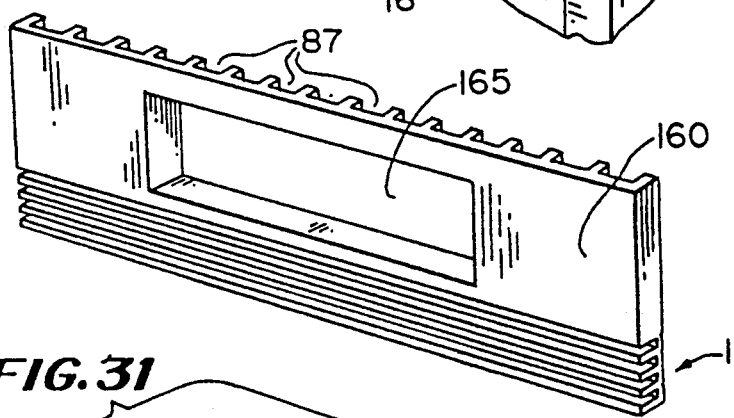
FIG. 30 is a perspective view of the exterior front face panel that is shown in FIG. 29.
Figure 31:
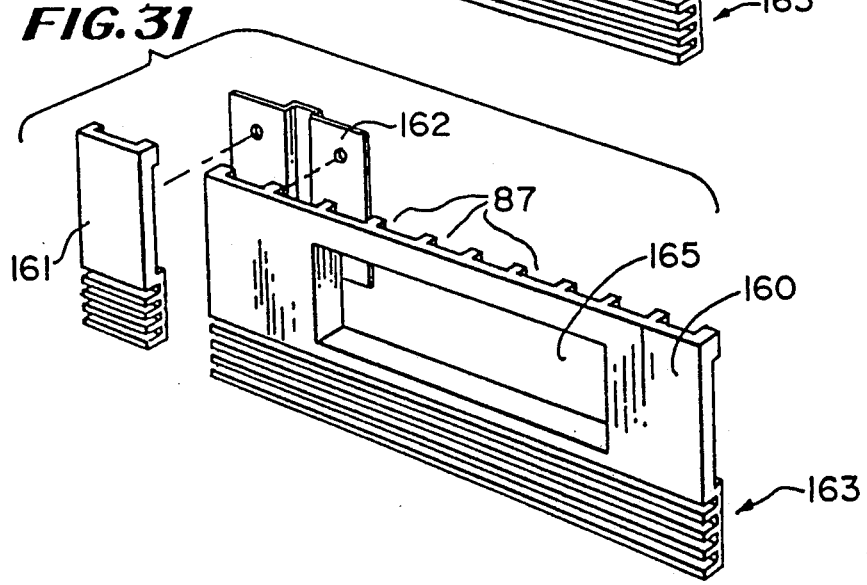
FIG. 31 is a perspective view of the exterior front face panel with optional extension member.

FIGS. 29 to 32 show the details of the construction of the front decorative face panel 160 that includes the inlet air vents 87. The front panel 16 of the distiller 15 fits through an opening 165 formed in the face panel 160. As FIG. 30 shows, the face panel 160 has a horizontal width that matches the drawer size of most residential cabinets. Still, as FIG. 31 shows, the width of the panel 160 can be enlarged by an optional panel extender 161 attached by a bracket 162.

Figure 32:
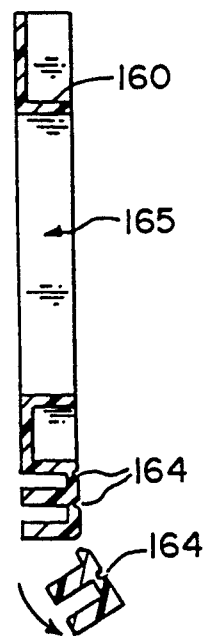
FIG. 32 is a side section view of the panel shown in FIG. 30, showing its break away louvers.

The vertical height of the panel 160 is adjustable on site by a series of frangible louver sections 163. A line of weakness 164 is formed on the back of the panel 160 between each louver section 163. As FIG. 32 shows, one or more louver sections 163 can be conveniently broken away by the user to create the vertical height required for the installation. When viewed from the front, the frangible louver sections 163 form a decorative pattern.

FIGS. 33 to 35 show an alternate arrangement for circulating air to and from the distiller 15 when installed in the base of the cabinet 10. In this arrangement, ambient air is brought to the distiller 15 through an inlet duct 150 cut in the toe of the cabinet 10. The air flow within the distiller 15 shown in FIG. 33 is the same as shown in FIGS. 4 and 6.

The air exiting the distiller through outlet vent 88 is channeled by way of an exterior baffle 151 through an outlet duct 152 cut in the toe of the cabinet 10. The baffle 151 fits through a plate 153 on the distiller base 24 that can be removed to adapt the distiller for the installation shown in FIGS. 33 to 35.

III. THE PURIFIED WATER DISPENSING ASSEMBLY

The purified water dispensing assembly 28 includes the tank 30 that receives the distilled, purified water for dispensing through the faucet 22. The holding tank 30 is preferably made of a plastic that is acceptable for contacting materials to be ingested by humans. The holding tank 30 includes an air vent 93 that includes an inline bacteria filter. In a preferred embodiment, the holding tank 30 contains about two gallons of distilled water.

A. WATER LEVEL CONTROL IN THE HOLDING TANK

As FIGS. 3, 4, and 7 best show, the purified water dispensing assembly 28 includes a distilled water delivery pump 89 that is controlled by the control module 29 through the operation of a float switch assembly 90. FIGS. 8 and 9 shown further details of the float switch assembly 90.

The float switch assembly 90 includes a siphon tube 91 that extends a predetermined distance into the holding tank 30. The inlet side of the pump 89 connects by the tubing 92 to the siphon tube 91 to draw water through the siphon tube 91 out of the tank 30. The outlet side of the pump 89 connects to the conduit 23 that leads to the faucet 22.

The float switch assembly 90 also includes a sample tube 94 next to the siphon tube 91. A water quality probe 95 occupies the sample tube 94. The probe 95 continuously measures the conductivity of the purified water and thereby senses the amount of total dissolved solids present. The sensor 95 conveys this information to the control module 29 for use in a way that will be described in greater detail later.

As FIGS. 9A, 9B, and 9C show, the sample tube 94 also contains a series of three reed switches, designated 96, 97, and 98. A member 99 encircles the sample and siphon tubes 91 and 94. The member 99 floats upon the water within the tank 30 and therefore rises and falls according to the water level present in the tank 30. The float member 99 carries a magnet 100. The magnet 100 actuates the reed switch 98 when the float member 99 is in the low water level position shown in FIG. 9A. The magnet 100 actuates the reed switch 97 when the float member 99 is in the intermediate water level position shown in FIG. 9B. The magnet 100 actuates the reed switch 96 when the float member 99 is in the high water level position shown in FIG. 9C. The reed switches 96, 97, and 98 convey information to the control module 29. The control module 29 uses this information to control distillation in a way that will be described in greater detail later.

However, generally speaking, the control module 29 will fully activate the steam chamber assembly 26 to generate distilled water at a maximum rate when the float member 99 reaches the low water level position (FIG. 9A). The control module 99 reduces the rate at which distilled water is made when the float member 99 reaches the intermediate water level position (FIG. 9B). The control module 29 will stop operation of the steam chamber assembly 26 when the float member 99 reaches the high water level position (FIG. 9C).

B. REMOVABLE HOLDING TANK

Figure 26:
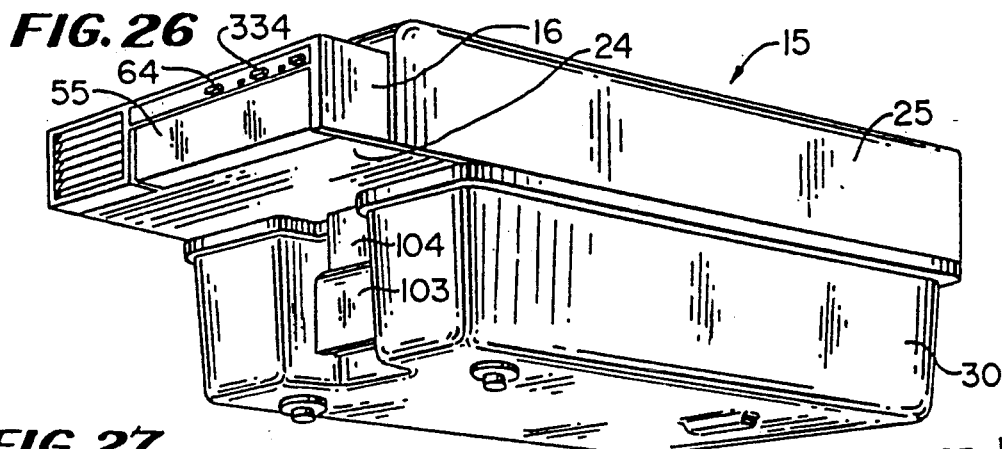
FIG. 26 is a bottom view of the bottom of the removable holding tank associated with the water distiller shown in FIGS. 2 and 3.
Figure 27:
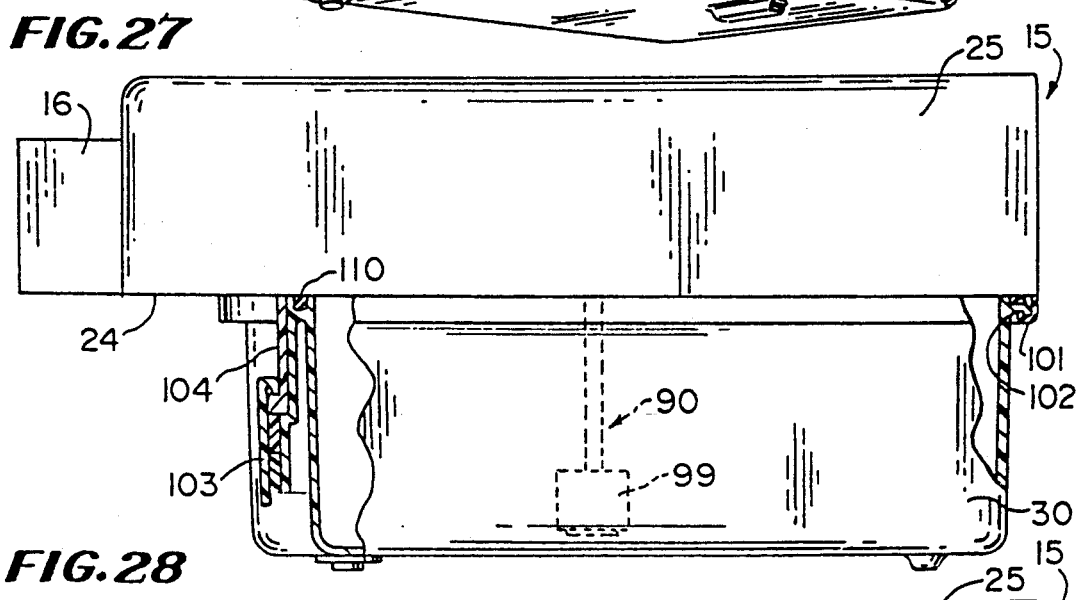
FIG. 27 is a side section view of the removable holding tank shown in FIG. 26 when engaged with the rest of the water distiller during use.
Figure 28:
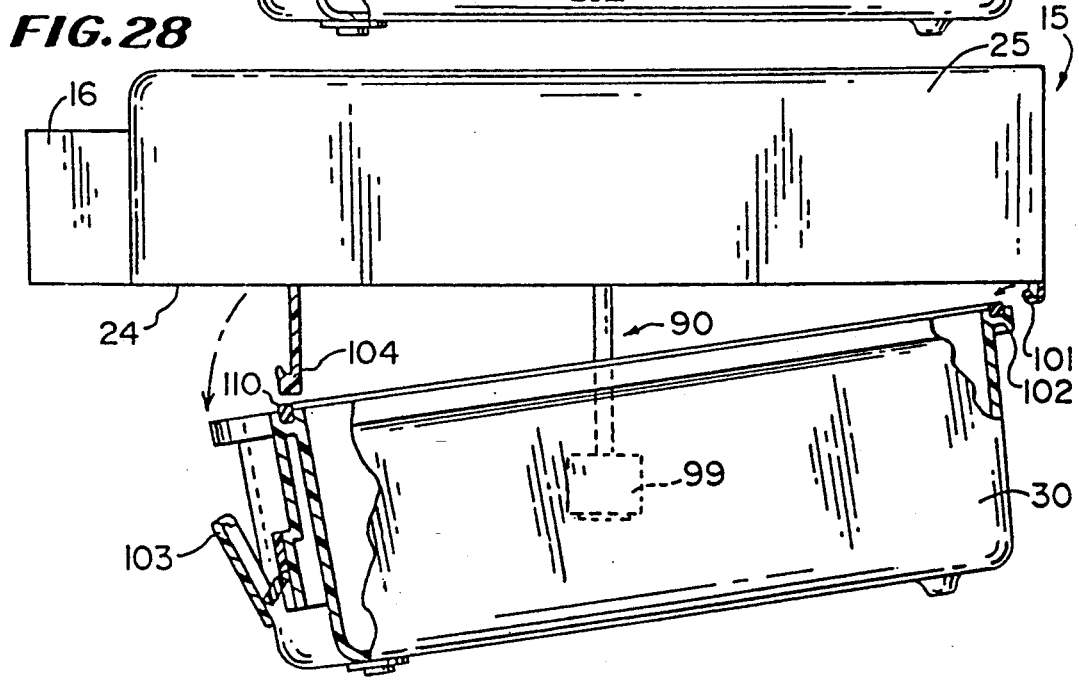
FIG. 28 is a side section view of the removable holding tank shown in FIG. 26 when disengaged from the rest of the water distiller for maintenance.
Figure 29:
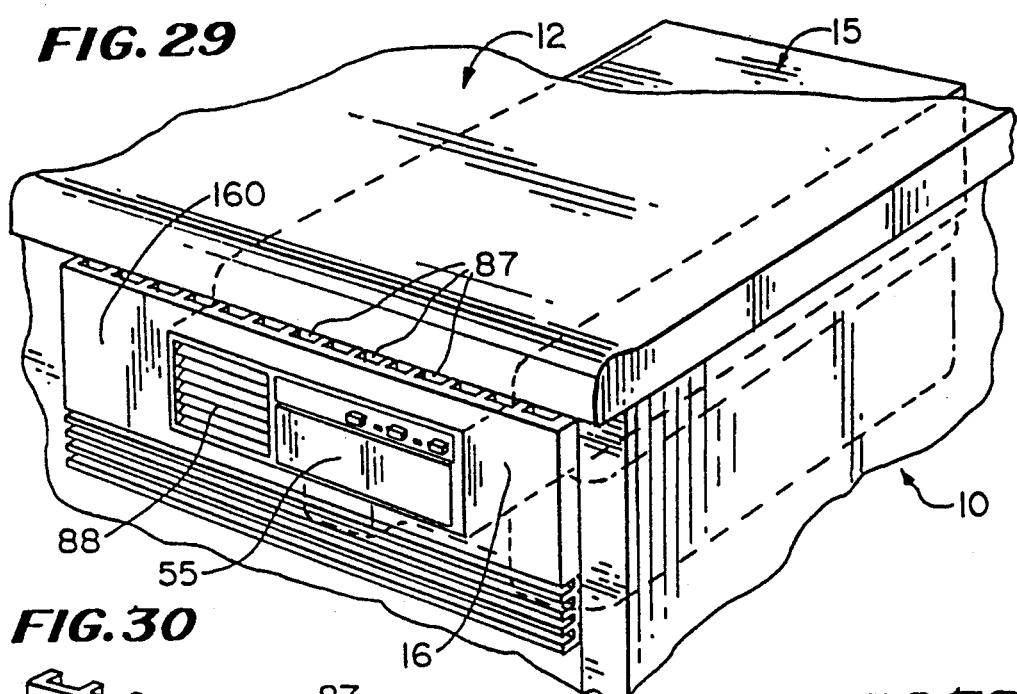
FIG. 29 is an enlarged view of the exterior front panel associated with the water distiller shown in FIG. 1, showing the ducts for circulating air into the cabinet for use by the distiller.

FIGS. 26, 27, and 28 show that the holding tank 30 can be easily detached from the base 24 of the distiller 15 for maintenance and cleaning.

More particularly, the rear of base 24 includes a pair of hook members 101. The rear of the holding tank 30 includes a pair of outwardly extending tabs 102 that mate with the hook members 101. When mated, the holding tank 30 can be pivoted into a generally horizontal position against the underside of the base 24 (as FIGS. 26 and 27 show). A latch 103 on the front of the tank 30 releasably engages a downwardly depending hook 104 on the underbody of the base 24 to secure the tank 30 in position against the base 24. A gasket 110 seals the interface between the tank 30 and the underside of the base 24.

As FIG. 28 shows, by releasing the latch 103, the holding tank 30 can be swing away from the base 24 to release the mating hooks 101 and tabs 102 to thereby free the tank 30 from the base 24.

C. PURIFIED WATER DISPENSING FAUCET

FIGS. 17 and 18 best show the details of the purified water faucet 22.

The faucet 22 serves several purposes besides being operable to draw drinking water. It contains a final filter 105 for the distilled water. The final filter 105 adsorbs any gases that may be dissolved in the distilled water. The final filter 105 also removes any vestiges of the disinfecting material 73 added to the water.

The faucet 22 also receives signals from the control module 29 for communication to the user. For this purpose, the faucet 22 includes a small display panel 106 (also shown in FIG. 5). The display panel includes several light emitting diodes (LED's) which in the illustrated embodiment number three, 107, 108 and 109. A multiple conductor cable 123 connect the diodes 107, 108, and 109 with the control module 29. The diodes 107, 108, and 109 flash on and off under the control of the control module 24 to indicate certain operational conditions prevailing in the distiller 15. The diodes 107, 108, and 109 also signal the user to take certain maintenance action, such as removing the drawer 35 for disposal of mineral or sediment, or changing the faucet filter 105. The operation of the diodes 107, 108, and 109 will be described in greater detail later.

The faucet 22 includes a base 111 in which a valve member 112 is rotatable by a handle 113. The valve member 112 has a through-hole 114. By rotating the handle 113, the hole 114 is aligned with the bore of the infeed pipe 23 to permit distilled water to enter a spout 115 through the filter 105.

FIGS. 17 and 18 show that the handle 113 and valve member 112 can be arranged to accommodate either left hand or right hand operation.

The filter 105 contains carbon particles 116. An open cell foam disk 117 passes water to the spout 115, but prohibits the carbon particles 116 from being carried along in the water stream.

The faucet 22 mounts in a suitable opening on the counter top 12 (see. FIGS. 1 and 2) and locks in place with a nut 118.

A decorative housing 119 encloses the filter 105. The spout 115 is attached by a nut 122 to the housing 119 for pivotal side-to-side movement. The housing 119 can be screwed on to and off the faucet base 111 to permit easy removal and replacement of the filter 105. The filter 105 includes top and bottom o-rings 120 that are seated with respect to the valve member 112 and the spout 115 when the housing 119 is screwed into place to capture the filter 105 within the housing 119.

The filter 105 can be easily replaced after it has been used and adsorbed enough water entrained organic or volatile organic contaminants to saturate the carbon filter material. No tool is necessary for this operation. Also, since the filter 105 is located between the valve member 112 and the spout 115, the filter 105 can be removed without deactivating the inlet pump 89 or otherwise depressurizing the purified water inlet line 23.

A check valve 124 (see FIGS. 4 and 5) maintains pressure in the conduit 23 between the pump 89 and the valve member 112 of the faucet 22.

IV. LOW PROFILE CONFIGURATION

As FIGS. 4 and 6 best show, the compact, low profile design of the distiller 15 is caused by the essentially horizontal arrangement of interior component parts that convert the supply water to steam, condense the steam into purified water, and dispense the purified water. The compact, low profile design is also caused by the essentially horizontal flow of water and air through the distiller during use.

As FIGS. 4 and 6 show, the steam chamber assembly 26 has a horizontal dimension greater than its vertical height. The condenser assembly 27 also has a horizontal dimension greater than its vertical height. The overall vertical height of the condenser assembly 27 is generally the same as the overall vertical height of the steam chamber assembly 26.

The raw (undistilled) water is delivered to the steam chamber assembly 26 in a path arranged along a generally horizontal plane. Steam is also conveyed from the steam chamber assembly 26 to the condenser assembly 27 in a path arranged along a generally horizontal plane that is parallel to the generally horizontal plane of the raw water supply.

Cooling air is also drawn through the condenser assembly 27 in a generally horizontal path that is parallel to the generally horizontal planes of the raw water and steam delivery paths.

V. THE OPERATION CONTROL MODULE

Figure 36A:
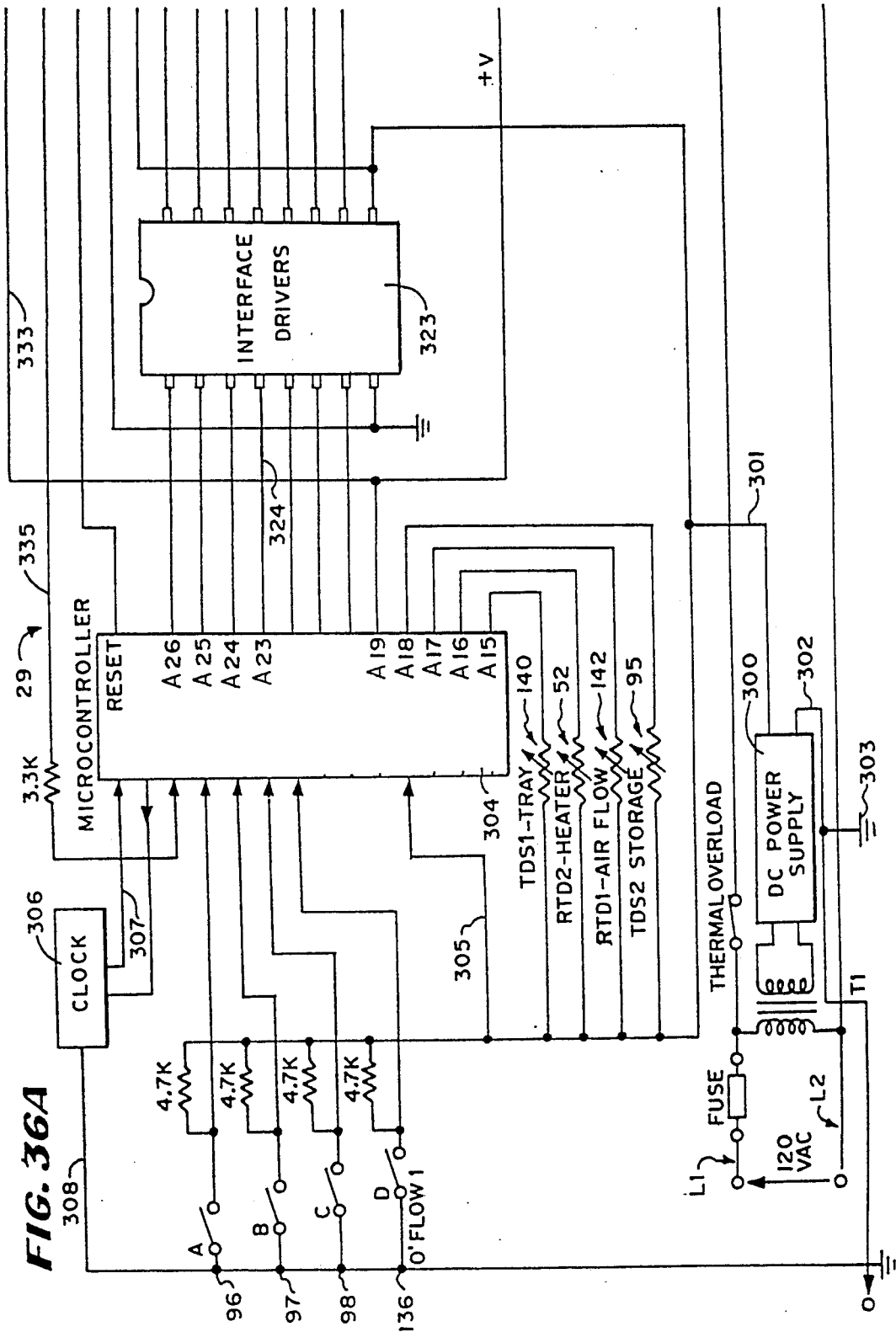
FIG. 36, composed of parts 36A and 36B, is a schematic diagram of the electrical control circuitry including a microprocessor based controller associated with the water distiller than embodies the features of the invention.
Figure 36B:
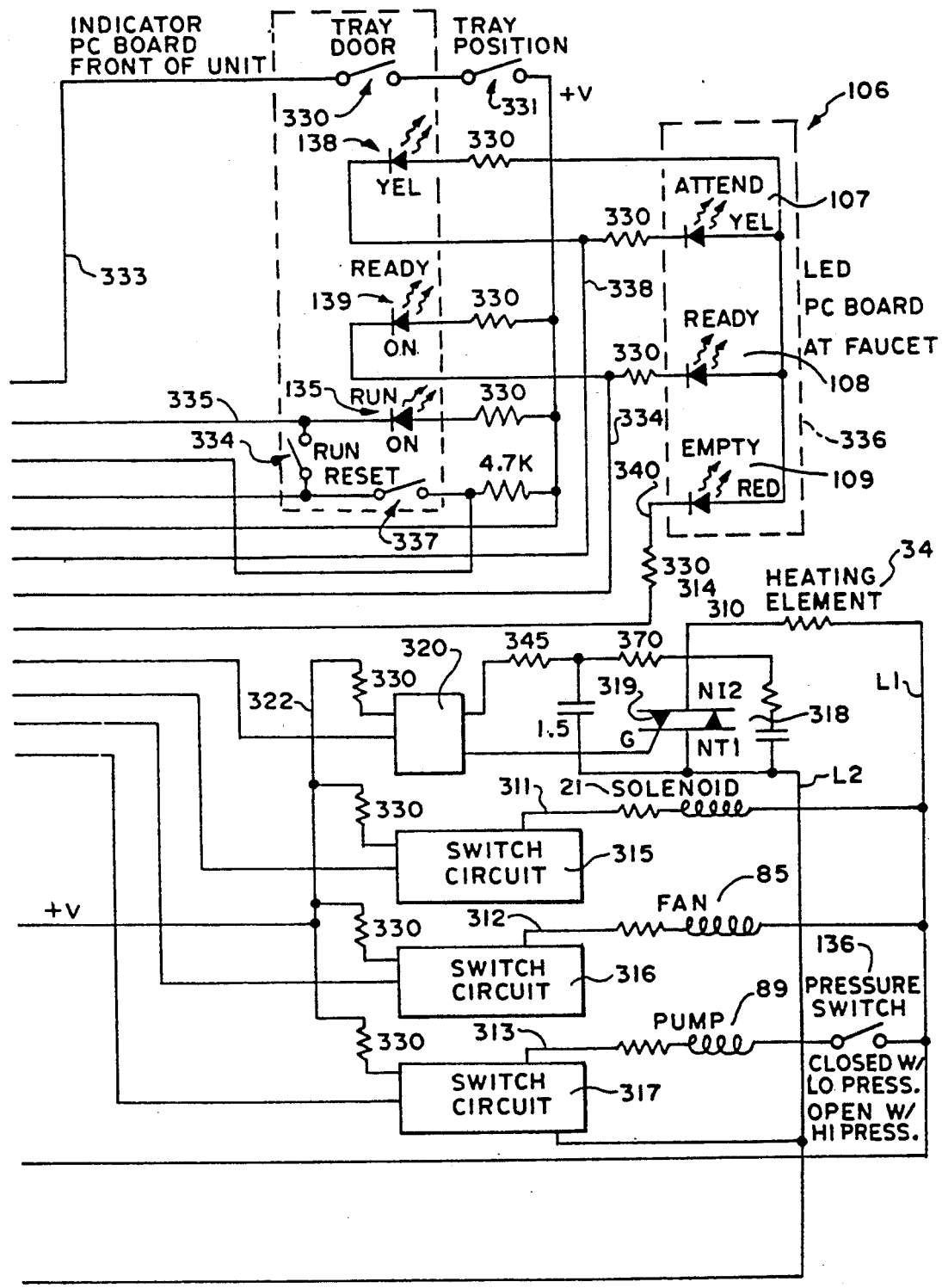

FIG. 36 shows the details of the operation control module 29, which will now be described in conjunction with the rest of the drawings.

The module 29 includes a DC power supply 300. Referring to the lower left hand corner of FIG. 36, lines L1 and L2 are the input for the power main voltage. This is usually 120 volts AC in the residential dwellings where the distiller 15 is installed. A fuse in the input line serves the usual circuit overload protecting function.

The primary winding of a step down transformer 130 (see also FIG. 3) is connected across lines L1 and L2. The output leads of the secondary winding are the input to the DC power supply 300. The power supply 300 is conventional in that it contains a rectifier bridge and an integrated circuit voltage regulator, neither of which are shown but which are well known to electronic circuit designers. Low voltage DC is supplied to the control module 29 by way of line 301, which is connected to the output terminal of the DC power supply 300. Another line 302 leads to ground 303.

The output voltage of the DC power supply 300 depends on the operating voltages of the various circuit components of the control module 29. In the illustrated embodiment, the output voltage is 5 volts DC.

The heart of the control circuitry is a microcontroller that is so labeled and identified further by the reference numeral 304. The microcontroller 304 is carried on a circuit board that is attached to the base 24 of the distiller 15 in the air flow path (as FIGS. 3 and 4 best show).

Suitable microcontrollers are available from several sources. The microcontroller 304 selected for use in the product is a Motorolla MC 68 HC 05 P8P type. It has on board read/write memory, read only memory and analog-to-digital (A/D) converters. Of course, it also contains the usual components of a microcomputer. The application program is stored in the on-board read-only (ROM) on the microcontroller chip.

A positive 5 volts DC is applied to the microcontroller 304 by way of line 305. Timing of certain system functions is governed by a clock pulse generator that is represented by the rectangle marked 306 and labeled "clock." The clock signals are delivered to the microcontroller 304 by way of a line 307. One terminal of the clock 306 connects to a ground line 308.

The right region of FIG. 36 shows the electrical components that are supplied with 120 volts AC. These components include the water heating element 34; the solenoid coil 21 for operating the water infeed valve 37; the motor for the cooling fan 85; and the pump 89 that supplies purified water to the faucet 22. These components are fed with 120 volts AC by way of a common line L1.

The heating element 34, solenoid 21, fan motor 85, and pump 89 become energized when their output lines 310, 311, 312 and 313 become connected to L2 by individual switching circuits. The switching circuits are represented generally by the reference numerals 314, 315, 316 and 317. Switching circuits 314–317 are similar so only circuitry 314 will be described.

The switching circuit 314 contains a triac 318 that connects the output line 310 of the heating element 34 to AC line L2. The triac 318 becomes conductive when its control electrode 319 is supplied with a trigger pulse from a triac driver 320. The driver 320 transmits trigger signals to the triac control electrode 319 in response to its associated line 321 going low at power line frequency or, in other words, when brought down to a low logical level compared with the 5 volt DC power supply voltage. Switching circuit 314 and the other switching circuits 315, 316, and 317 have DC voltage applied to them by way of having a common line marked 322.

Line 321 is brought down to a low logic level as the result of the action of an integrated circuit represented by the rectangle marked 323 and labeled "interface drivers." The signal to connect line 321 to ground is, of course, initiated by a corresponding signal delivered by way of line 324 from the microcontroller 304 to an input pin of the interface driver circuit.

As is well known to electronic circuit designers, an interface driver is often used to overcome the problem of microcontrollers that can sink very low level currents. Thus, the drivers respond to a signal from the microcontroller 304 to ground the line by making the ground connection in isolation from the microcontroller. There are capacitors and resistors, as shown, associated with the triac to filter radio frequency interference voltages that are incidental to triac operation.

It will be evident from inspection of FIG. 36 that the other switching circuits have lines corresponding to line 321 connected to output pins of the interface drivers integrated circuit 323. Similarly, the triacs in these switching circuits are made conductive by signals initiated by the microcontroller 304.

It should be understood that relays, not shown, could be used instead of triacs to connect and disconnect the heating element 34, the infeed valve control solenoid 21, the fan motor 85 and the pump motor 89 to line L1.

A. THE DISTILLATION CYCLE

Production of distilled water will not begin until the front drawer panel 55 of the distiller 15 is closed and the drawer 35 is in its fully sealed position within water heating chamber 31 (the position shown in FIGS. 10 and 19). The upper part of FIG. 36 show two interlock switches 330 and 331 that serve this purpose. Switch 330 is set in closed position when the tray access door at the front of the distiller 15 is closed. Switch 331 is closed when the drawer 35 is in its fully sealed relationship within the heating chamber 31.

In the illustrated embodiment (see FIGS. 10 and 19), switch 330 takes the form of a magnet 131 carried by the drawer panel 55 and an associated magnetic proximity switch 132 carried on the panel 16 near the latch mechanism 63. Switch 331 takes the form of a magnet 133 carried on the rear of the drawer 35 and an associated magnetic proximity switch 134 carried on the rear wall of the cover 25.

The switches 330 and 331 are connected in series in a circuit that begins at a positive DC line 301 and continues to the microcontroller 304 by way of a line 333. If either of the interlock switches 330 or 331 are open, pin A19 of the microcontroller 304 does not have the positive DC voltage applied to it, in which case the microcontroller 304 disables those functions of the distiller 15 that are necessary for the distillation of water.

Another necessary condition for activating the distiller 15 is to have the "RUN" switch 334 closed by manual operation from the front of the distiller (see FIGS. 4 and 22). This causes a "RUN" LED 135 located on the front panel 16 (also shown in FIGS. 4 and 22) to turn on, indicating that the distiller 15 is ready to begin operation. The LED 135 is preferably one that emits green light.

Closing the "RUN" switch 334 also connects a line 335 to ground state. The microcontroller 304 is signalled to allowed distiller operation by issuing appropriate commands.

The left region of FIG. 36 shows the three previously described float operated reed switches 96, 97, and 98 in the holding tank 30. These switches 96, 97, and 98 are also designated by their circuits in FIG. 36, which are respectively marked Switches A, B and C.

In the start up condition, the float 99 is in its lowermost position in the holding tank 30, because the tank 30 is drained (as FIG. 9A shows). Reed switch 98 (Switch C) is thus closed. The microcontroller 304 responds to the closure of Switch C by causing the LED 109 on the faucet 22 (see FIG. 5) to turn on adjacent the legend "EMPTY."

The "EMPTY" LED 109 is mounted on a printed circuit board 336, as indicated by a dashed line rectangle marked 336. The LED 109, when on, indicates that the holding tank 30 is empty and that water is not available for being drawn out of the faucet 22. The "EMPTY" LED 109 is preferably red in color.

The previously described LED's 107 and 108 on the faucet 22 (shown in FIG. 5) are also mounted on the circuit board 336. Faucet LED 108 preferably emits green light and has the legend "READY" placed next to it. This LED 108 tells the user that the distiller is in condition or ready for having water withdrawn from the faucet 22. Faucet LED 107 preferably emits yellow light when it is energized and is located adjacent the legend "ATTEND." The specific conditions that must be met for the "ATTEND" and "READY" LED's to turn on will be discussed in greater detail later.

The microcontroller 304 prohibits the distilled water output pump 89 from running when switch C is closed. However, the microcontroller 304 will cause line 321 of the heating element switching circuit 314 to go to a low logic level to cause the element 34 to heat up. The sensor 52 (also labeled RTD2-HEATER in FIG. 36) monitors the temperature in the region of the deflected portion 50 of the element 34. RTD2 is symbolized by a resistor that varies linearly in response to the temperature to which it is exposed. RTD2 is exposed to the heating element 34 and always reflects the temperature of the deflected portion 50 of the element 34.

At this time, the microcontroller 304 will also cause the line of the switching circuit 315 to go to a logic low level to energize the solenoid 21 for a brief time (for example, one or two seconds) to bring some water into the heating chamber 31. The solenoid 21 is then turned off while the deflected portion 50 of the element 34 heats to a predetermined high distillation temperature, which in the illustrated embodiment is 110°±3° C. The motor for the fan 85 will also be energized at this time to aid in dispersing the heat radiated from the steam chamber assembly 26.

When the deflected portion 50 of the element 34 reaches the predetermined distillation temperature, the solenoid 31 opens the raw (undistilled) water infeed valve 37 to begin supplying water to the water heating chamber 31. The element 34 and the sensor 52 will cool as water enters the heating chamber 31. When the sensed temperature of the deflected portion 50 falls to a predetermined intermediate level (which in the illustrated embodiment is 103°±3° C.), the solenoid 31 closes to stop the flow of water into the chamber 31. Should the temperature of the deflected portion 50 of the element 34 fall below a predetermined low level (which in the illustrated embodiment is 96°±3° C.), the element 34 is turned on again until the predetermined high distillation temperature of 110°±3° C. is reached.

Then, more water is brought into the heating chamber 31 (by opening solenoid 21).

The above described sequence repeats until the water level in the drawer 35 touches the lower surface of the heating element 34. At this time, generation of steam for being condensed into distilled water begins. The fan 85 continues to draw cooler room temperature air through the condenser assembly 27 to condense the steam into purified water that collects in the holding tank 30.

As the water boils away from the heating element 34 during the distillation process, sensor 52 (RTD2) senses the rise in temperature at the deflected portion 50 of the heating element 34. When the temperature of the deflected portion 50 reaches 110°±3° C., the heating element 34 is turned off, and the solenoid 21 controlling the infeed valve 37 is energized again to bring more water into the chamber 31. As the water enters the heating chamber 31 (cooling the element 34), the temperature sensed by RTD2 will reach the predetermined intermediate level (103°±3° C.). The solenoid 21 closes.

By sensing the temperature of the element 34 at the deflected portion 50, the microcontroller 304 maintains a desired level of water with respect to the remainder of the element 34. More particularly, the water in the heating chamber 31 is maintained at a level that is approximately one-eighth inch above and below the centerline of the element 34. This level is desirable for the heating element 34 to operate most efficiently as a film evaporator.

As the temperature of the element 34 drops below the predetermined low level (96°±3° C.) during the distillation process, the element 34 is turned on until the predetermined high temperature (110°±3° C.) is again attained.

The cycle described in the preceding three paragraphs is repeated during the distillation cycle. The distiller 15 will continue to make purified water until the float 99 closes the reed switch 96 (switch A in FIG. 36). This position is shown in FIG. 9C. At that time the holding tank 30 is full of water. The heating element 34, the solenoid 31, and the cooling fan 85 are turned off. The distillation cycle remains completely inactive until water is drawn out of the holding tank 30.

During operations to replenish an empty holding tank 30, initiated by a closing of the reed switch 98 (Switch C), the distillation process proceeds for a specified replenishment period (for example, one hour) before the microcontroller 304 enables the purified water supply pump 89 to allow the user to again draw purified water from the holding tank 30 upon demand. At this time, the microcontroller activates the "READY" LED 108 (green in color) on the faucet 22. A corresponding green light emitting LED 139 located on the front panel 16 of the distiller 15 will also be turned on (see FIGS. 4 and 22).

When the float operated reed switch 98 (switch C) is closed because of a low water level in the holding tank 30, the heating element 34 will be initially operated during the distillation process at a high power condition (for example, a 500 watt level) to thereby optimize the speed of the distillation process. The water level will rise in the holding tank 30 as more purified water is distilled. The pump motor 89 will turn on periodically to pressurize the output line 23 to the faucet 22. This pressure is maintained by the check valve 124.

The accumulation of purified water in the holding tank 30 will cause the float 99 to rise until it makes contact with the reed switch 97 (which is indicated by the letter "B" in FIG. 36). This position is shown in FIG. 9B. The contact closes the reed switch 97 (switch B). This state of the switch B is detected by the microcontroller 304 by a line leading from switch B. The microcontroller 304 responds by switching the phase angle at which the triac 318 for the heating element 34 is triggered so that the heating element 34 only receives enough current to heat it at a reduced power condition (for example, a 250 watt level). At this time, the speed of the condenser fan 84 could also be reduced in view of the reduced heat conditions.

Of course, it should be recognized that the 500 and 250 watt heating levels selected in this illustrative embodiment of the invention could have other values as well. Concrete numbers are chosen in the description to simply illustrate the heating values that have been chosen in a commercial embodiment of the distiller.

An alternate approach to varying heating element power dissipation can involve the use of a probe in the form of a conductivity sensor (not shown) extending into the holding tank 30 from the highest to the lowest expected water levels in the tank. Essentially, the conductivity sensor can include two parallel vertically extending conductors that are spaced apart from each other and have an electrical resistance between them that varies with the extent to which the conductors are immersed in water. Thus, the resistance varies continuously with changes in the water level. The microcontroller 304 senses these changes in voltage or current levels and converts the corresponding signals into digital form for processing. The signals can be used to vary the wattage dissipated by the heating element on a continuous basis between low and high wattage limits, such that the wattage is increased as the water level in the holding tank 30 decreases so that distilled water is produced at a higher rate when the tank 30 is tending towards depletion, and vice versa. The power or wattage supplied to the heating element is caused to vary by phase shifting. Although not shown in the drawings, means are provided for delivering a signal to the microcontroller 304 indicative of a zero crossing (that is, crossing of the alternating current wave form between positive and negative) so that time zero is used as a reference for establishing the amount of shift of the trigger signals and, therefore, the amount of power delivered to the heating element.

When water is drawn out of the holding tank 30, the pressure switch 136 shown in the far right portion of FIG. 36 closes. This switch 136 closes in response to low pressure and opens when high pressure exists between the check valve 124 and the faucet 22.

The user can continue to draw water from the holding tank 30 until the float 99 descends low enough to close reed switch 98 (switch C in FIG. 36). When reed switch 97 (switch B in FIG. 36) is closed by the descending float 99, the distiller 15 will again begin to make purified water again at the 250 watt power level. When the descending float closes reed switch 98 (switch C), the unit will revert to making water at the 500 watt power level.

B. OVERFLOW SENSOR

There is another float operated switch 136 (switch D in FIG. 36) shown in the drawings. This float switch 136 is installed in a sump 137 (see FIGS. 3 and 10) formed in the base 24 of the distiller 15. The sump 137 collects water that may be the result of a leak in the system or overflow. The float switch 136 (switch D) is activated in response to overflow being detected. The switch 136 pulls the line that connects it to the microcontroller 304 pin 7 down to ground level. When this occurs, the microcontroller 304 de-energizes the distiller 15 by disabling the solenoid 21.

C. ATTEND WATER FILTER SIGNAL

As mentioned earlier, the faucet 22 includes a filter 105 for adsorbing materials that may remain in the distilled water. A signal is derived as a function of the amount of water that is processed by the distiller 15, which, in turn, is a function of the power level and operating time of the distiller 15. This signal occurs when a predetermined amount of water has been distilled, which indicates that the filter 105 may be saturated with volatiles and replacement is desirable. The microprocessor 304 derives the water consumption as a function of time by counting pulses and accumulating the time and memory. The predetermined time will depend upon an empirical determination of the proper time resulting from experience derived with a particular type of raw water. Once the predetermined time is reached, the microcontroller 304 will provide a predetermined water filter "ATTEND" signal.

The water filter "ATTEND" signal is a flash-pause sequential operation of the "ATTEND" LED's 107 and 138. This unique signal continues until the RESET switch 337 is pressed again. This turns off the LED's 107 and 138 and resets this portion of the memory for beginning to monitor a new usage term of the faucet filter 105.

D. CLEAN TRAY ATTEND SIGNAL

As FIG. 36 shows, the distiller 15 includes a sensor 140 for detecting the total dissolved solids entering the water heating chamber 31. FIG. 6 also shows the sensor 140 in position within the undistilled water inlet pipe 20 upstream of the valve 37. This sensor 140 is also labeled TDS1-TRAY in FIG. 36. The sensor 140 is symbolized by a variable resistor that varies in response to conductivity of the water entering the tray 36. The objective is to cause an indication that the tray 36 should be removed for disposal or cleaning.

A unique signal indication of the need for cleaning the tray 36 is used. For example, the need for cleaning the tray 36 may be indicated by the "ATTEND" LED's 107 and 138 being continuously illuminated while under the control of the microcontroller 304.

The signal indicative that the tray 36 should be cleaned is a function of the amount of water processed and the total dissolved solids of the incoming water. There are two ways that the tray cleaning signal can be derived. One is to rely upon the amount of water processed. Another way is to coordinate the amount of water processed with the quality of the raw (undistilled) water based upon the signal derived from the total dissolved solids sensor 140 (TDS1). The microcontroller 304 can derive these relationships by coordinating the time during which the element 34 is operating at 250 or 500 watts, which is also inherently a function of running time of the unit and the operating power level.

For example, when the distiller is using water that has intermediate mineral content, and has processed approximately 50 gallons of water with a total dissolved solids level of about 300 ppm, the microcontroller 304 will initiate a self cleaning mode (described below) and generate an internal signal to initiate the tray "ATTEND" sequence. In this circumstance, the distiller 15 will continue to make distilled water until it has filled the holding tank 30 and float operated reed switch A is closed.

E. SELF CLEANING MODE

When the distilled water holding tank 30 is filled, as indicated by reed switch 96 (switch A) closing, the distiller 15 will stop making water. The distiller 15 will automatically enter its previously described self-cleaning mode. In this mode, the temperature of the heating element 34 is allowed to rise to approximately 145° C. (293° F.) as sensed by RTD2 detector. This temperature is sufficient to cause mineral or scale that has formed on the heating element to crack off and fall into the removable tray 36. After a predetermined time as measured by the microcontroller 304, the heating element 34 is turned off. The fan 85 stays on for approximately one-half hour to cool down the unit, until the RTD2 detects that the temperature of the heater 34 is down to approximately 45° C. (113° F). During this time, purified water may be pumped out of the holding tank 30, but the distiller will not begin making new water.

After expiration of the time delay, the "ATTEND" LED 107 on the faucet 22 (see FIG. 5) will turn on and stay on. Another "ATTEND" LED 138 (yellow in color) mounted on the front panel 16 will also turn on (see FIGS. 4 and 22). When the "ATTEND" LED's 107 and 138 are on, the distiller 15 is not allowed to make water again until the tray 35 is opened and the reset switch 337 (see FIGS. 4 and 22) is closed momentarily.

The "ATTEND" LED's 107 and 138 indicate that the user should open the front drawer 55 and withdraw the tray 36 for cleaning. When the reset button is activated, the "ATTEND" LED's 107 and 138 will go out, and the distiller 15 will be enabled to create steam and make distilled water again.

One may see that the DC line voltage plus V is applied from line 301 to the anodes of the various LED's found on both the PC circuit board 336 and the front panel 16. The LED cathodes are attached to ground to turn them on by the microcontroller pins A24 and A26 switching to a low logic level state, which brings about grounding of the return lines 337, 338 and 339 by causing the drivers in the interface driver circuit 323 to connect lines 338 and 339 to ground. Similarly, the red light emitting LED 109 (that indicates that the holding tank 30 is empty or below a level where water is allowed to be drawn from the holding tank 30) has a line 340 connected to the LED cathode that is grounded in response to pin A23 of the microcontroller 304 switching to a low logic level.

F. AIR FILTER ATTEND SIGNAL

The distiller 15 also preferably includes the air filter 141 and an air temperature sensor 142 in the flow path through the condenser assembly 27 (as FIG. 6 shows). The air filter 141 is preferably made of a cleanable mesh or foam material and is positioned in the air flow upstream of the condenser assembly 27. The air temperature sensor 142 (which is also labeled RTD1 in FIG. 36) is positioned in the air flow path (as FIG. 6 shows) downstream of the condenser assembly 27.

When the temperature sensed by the sensor 142 is above a predetermined level (for example, about 55°±3° C.), the microcontroller 304 will generate a specified air filter "ATTEND" flash sequence using the LED's 107 and 138. For example, the "ATTEND"

LED's 107 and 138 can flash twice and then pause to indicate that the air filter 141 should be cleaned or replaced.

The specified air filter "ATTEND" signal is indicative of several possible operating conditions. One is that the air filter 141 is so clogged or dirty that it is restricting air flow, therefore raising the air temperature in the flow path. It may also indicate that the incoming room air is warmer than normal. Warmer incoming room air would require more frequent cleaning of the air filter 141 to assure proper cooling within the distiller 15. The air filter "ATTEND" signal would also be generated by the microcontroller 304 if the air fan motor fails or otherwise requires maintenance.

In response to the air filter "ATTEND" signal, the user pushes the "RUN" switch 334 to shut down the distiller 15. After cleaning or replacing the air filter 141, the user pushes the "RUN" switch 334 again to start the distiller 15. The user also pushes the "RESET" switch 337 to turn off the flashing "ATTEND" lights.

Preferably, the microcontroller 304 is programmed to automatically shut down the distiller 15 whenever the sensor 142 (RTD1) detects a prescribed high level, for example 60°±3° C. The distiller 15 will automatically restart and operate normally when the RTD1 sensor detects that the air temperature has dropped below the prescribed high level.

G. CLEAN HOLDING TANK ATTEND SIGNAL

The distiller 15 is also provided with the sensor 95 for continuously monitoring the amount of total dissolved solids in the holding tank 30. This sensor 95 is also labeled TDS2-STORAGE in FIG. 36. The probe 95 is a commercially available conductivity sensor that produces an analog signal depending on conductivity. The signal is delivered to pin A18 of the microcontroller 304.

The microcontroller 304 shuts down the distiller and disables the purified water pump motor 89 whenever the amount of total dissolved solids detected by the sensor 95 exceeds a prescribed threshold level in terms of parts per million. When this threshold level is exceeded, the microcontroller 304 also responds by turning off the "READY" green light emitting LED's 108 and 139. Instead, the microcontroller 304 repeatedly operates the "ATTEND" LED's 107 and 138 in a triple flash-pause cycle until corrective action is taken.

The analog signal derived from TDS2 is connected to one pin A18 that is in an input to an analog-to-digital converter in the microcontroller 304. The signals from TDS1, RTD2, and RTD1 are also analog signals that are input to pins A15, A16 and A17 of the microcontroller 304, which are, in turn, input to an analog to digital converter.

The distiller 15 that embodies the features of the invention purifies water upon demand on a continuous basis. The distiller 15 also monitors itself on a continuous, real-time basis. Its operation is automatic and, except for periodic maintenance, is independent of any user involvement.

Various features of the invention are set forth in the following claims.

We claim:

1. A water distiller comprising
   a housing having an open interior area, the housing having a door movable between an opened position permitting access into the interior area and a closed position blocking the access,
   a steam chamber located in the interior area, the steam chamber including a movable bottom portion defining a tray for holding water to be distilled and a fixed top portion for collecting steam created in the chamber by heating the water in the tray, the steam chamber further including means for heating water in the tray to create steam,
   first means for moving the tray between a first position, in which the tray is located in sealed relationship with the top portion of the steam chamber thereby closing the steam chamber to the housing interior, and a second position in which the tray is located out of the sealed relationship with the top portion thereby opening the steam chamber to the housing interior, and
   second means connecting the housing door and the first means for moving the tray into the first position in response to moving the door from its opened position toward its closed position and for moving the tray into the second position in response to moving the door from its closed position toward its opened position, the second means being further operative, when the door is in its opened position, for exposing the tray for removal from the housing interior for cleaning.

2. A distiller according to claim 1
   and further including a condenser having an inlet communicating with the top portion of the steam chamber, and
   check valve means in the inlet for opening communication between the steam chamber and the condenser in response to steam pressure above atmospheric pressure in the steam chamber and for closing communication between the steam chamber and the condenser in the absence of the steam pressure in the steam chamber.

3. A distiller according to claim 1
   wherein the door is movable into a partially opened position between its opened and closed positions, and
   wherein the second means is operative for moving the tray between its first position and its second position in response to movement of the door between its closed position and its partially opened position and for exposing the tray for removal from the housing interior in response to movement of the door from its partially opened position to its opened position.

4. A distiller according to claim 3
   wherein the second means includes latch means for holding the door in its partially opened position to prevent removal of the tray and means for releasing the latch means to open the door in response to an external force applied by a user of the distiller.

5. A distiller according to claim 1
   wherein the tray is made of a disposable plastic material.

6. A distiller according to claim 1
   wherein the tray includes side walls defining an open interior area for holding water, and
   means defining a chamber within the interior area for holding a water soluble disinfectant within the open interior area.

7. A distiller according to claim 1
   and further including control means operable in a first mode for operating the heating means in a prescribed range of temperatures to generate steam from the water in the tray and in a second mode for operating the heating means above the prescribed range of temperatures to clean scale from the heating means for collection in the tray.

8. A distiller according to claim 7 wherein the control means includes means for shifting its operation between the first and second modes of operation according to at least one preselected criteria.

9. A distiller according to claim 7 wherein the control means includes means for signalling to a user of the distiller that the second mode of operation has been conducted and for urging the user to remove the tray for cleaning.

10. A steam chamber comprising:
a steam receiving chamber having an open downwardly presented bottom and a closed top,
a water retaining tray having a closed bottom and an upwardly presented open top,
cam means for lifting the tray to place the open top of the tray in sealing relationship with the open bottom of the steam receiving chamber in response to moving the tray generally horizontally in one direction below the stream receiving chamber to thereby define an enclosure for generating steam, the means being further operative for lowering the tray to break the sealing relationship in response to moving the tray generally horizontally in an opposite second direction below the steam receiving chamber, and
means in the steam receiving chamber for heating water in the tray when the tray is in sealing relationship with the steam chamber.

11. A steam chamber according to claim 10 and further including a gasket against which the sealing relationship between the tray and the steam receiving chamber is formed.

12. A steam chamber according to claim 10 wherein the tray has opposed first and second ends, one of the ends having a curved surface constituting a cam surface, and
wherein the cam means includes means engaging the curved cam surface for vertically lifting and lowering the tray in response to horizontal movement of the tray.

13. A steam chamber according to claim 12 wherein the cam means includes roller means mounted for rotating about an axis which is transverse to the direction of the horizontally moving tray, the roller means contacting the cam surface of the tray to vertically lift the tray when it is moved horizontally beneath the steam receiving chamber in the first direction and to vertically lower the tray when it is moved horizontally beneath the steam receiving chamber in the second direction.

14. A steam chamber according to claim 10 wherein the tray includes side walls defining an open interior area for holding water, and
means defining a chamber within the interior area for holding a water soluble disinfectant within the open interior area.

15. A steam chamber for a water distilling apparatus comprising
a movable bottom portion defining a tray for holding water to be distilled,
a fixed top portion for collecting steam created in the chamber by heating the water in the tray,
means for heating water in the tray to create steam,
first means for moving the tray between a first position, in which the tray is located in sealed relationship with the top portion of the steam chamber, thereby closing the steam chamber for the generation of steam, and a second position in which the tray is located out of the sealed relationship with the top portion, thereby opening the steam chamber for cleaning of the tray,
a steam outlet communicating with the top portion of the steam chamber, and
check valve means in the outlet for opening communication through the outlet in response to steam pressure above atmospheric pressure generated in the steam chamber when the tray is in its first position and for closing communication through the outlet in the absence of the steam pressure in the steam chamber when the tray is in its second position.

16. A steam chamber according to claim 15 and further including baffle means extending between the tray and the top portion for allowing steam to enter the top portion of the steam chamber while preventing water globules carried in the steam from entering the top portion of the steam chamber.

17. A water distiller comprising
a housing having an interior area,
a steam chamber located in the interior area, the steam chamber including a bottom portion defining a tray for holding water to be distilled and a top portion for collecting steam created in the chamber by heating the water in the tray, the steam chamber further including means for heating water in the tray to create steam,
a condenser located in the interior area, the condenser including
an inlet communicating with the top portion of the steam chamber for receiving steam,
means for cooling the received steam to convert the steam into purified water, and
an outlet for discharging the purified water,
a holding tank for holding the purified water, the tank having opposite side edges, and
the tank and the housing including
pivot means for attaching one side edge of the tank to the housing for swinging the tank between a first position, in which the tank engages the housing and communicates with the condenser outlet for receiving purified water, and a second position, in which the tank is swung away from the housing, the pivot means being releasable when the tank is in its second position for connecting and disconnecting the tank to and from the housing, and
cooperating latching means for releasably attaching the other side edge of the tank to the housing when the tank is in its first position.

18. A water distiller according to claim 17 and further including
means for sensing the quality of the water contained in the holding tank, and
control means for urging a user of the distiller to remove the holding tank in response to a predetermined condition detected by the sensing means.

19. A water distiller according to claim 17 wherein the bottom tray portion of the steam chamber is movable with respect to the top portion, and further including means for moving the tray between a first position, in which the tray is located in sealed relationship with the top portion of the steam chamber thereby closing the steam chamber to the housing interior, and a second position, in which the tray is located outside the housing and out of the sealed relationship with the to portion for maintenance.

20. A water distiller according to claim 19 wherein the tray includes side walls defining an open interior area for holding water, and means defining a chamber within the interior tray area for holding a water soluble disinfectant within the interior tray area.

21. A water distiller according to claim 19 and further including control means operable in a first mode for operating the heating means in a prescribed range of temperatures to generate steam from the water in the tray and in a second mode for operating the heating means above the prescribed range of temperatures to clean scale from the heating means for collection in the tray.

22. A distiller according to claim 21 wherein the control means includes means for signalling to the user that the second mode of operation has been conducted and for urging the user to remove the tray for cleaning.

* * * * *

UNITED STATES PATENT AND TRADEMARK OFFICE
CERTIFICATE OF CORRECTION

PATENT NO. : 5,196,093

DATED : March 23, 1993

INVENTOR(S) : Weber et al.

It is certified that error appears in the above-identified patent and that said Letters Patent is hereby corrected as shown below:

Column 27, Claim 10, Line 23:

"stream" should be ---steam---.

Column 29, Claim 19, Line 7:

"to" should be ---top---.

Signed and Sealed this

Twenty-ninth Day of March, 1994

Attest:

BRUCE LEHMAN

Attesting Officer

Commissioner of Patents and Trademarks